(12) United States Patent
Scelsi et al.

(10) Patent No.: US 12,443,182 B2
(45) Date of Patent: Oct. 14, 2025

(54) SYSTEMS AND METHODS TO ENSURE SAFE DRIVING BEHAVIORS ASSOCIATED WITH REMOTE

(71) Applicant: Vay Technology GmbH, Berlin (DE)

(72) Inventors: Fabrizio Scelsi, Berlin (DE); Bogdan Djukic, Berlin (DE); Daniel Buchmueller, Truckee, CA (US); Thomas von der Ohe, Berlin (DE); Nicolai Wojke, Berlin (DE)

(73) Assignee: Vay Technology GmbH, Berlin (DE)

( * ) Notice: Subject to any disclaimer, the term of this patent is extended or adjusted under 35 U.S.C. 154(b) by 267 days.

(21) Appl. No.: 18/054,328

(22) Filed: Nov. 10, 2022

(65) Prior Publication Data

US 2024/0160205 A1 May 16, 2024

(51) Int. Cl.
*G05D 1/00* (2024.01)
*B60W 60/00* (2020.01)
*G06V 20/56* (2022.01)

(52) U.S. Cl.
CPC ....... *G05D 1/0044* (2013.01); *B60W 60/0015* (2020.02); *G05D 1/0038* (2013.01); *G06V 20/56* (2022.01); *B60W 2420/403* (2013.01); *B60W 2420/54* (2013.01); *B60W 2556/45* (2020.02)

(58) Field of Classification Search
CPC ............... G05D 1/0044; G05D 1/0038; G05D 2105/20; G05D 1/2243; G05D 1/2249; G05D 1/82; G05D 2107/13; G05D 2109/10; B60W 60/0015; B60W 2420/403; B60W 2420/54; B60W 2556/45; G06V 20/56
See application file for complete search history.

(56) References Cited

U.S. PATENT DOCUMENTS

| 11,480,961 | B1 | 10/2022 | Chebiyyam et al. |
| 11,787,438 | B2* | 10/2023 | Houshmand ......... G05D 1/0038 701/2 |
| 2017/0123419 | A1* | 5/2017 | Levinson ............ H04L 41/0816 |
| 2017/0220036 | A1* | 8/2017 | Visser ................... H04R 1/406 |

(Continued)

FOREIGN PATENT DOCUMENTS

EP 3702864 B1 10/2021

OTHER PUBLICATIONS

International Search Report and Written Opinion mailed Jan. 25, 2024 in related Application No. PCT/EP2023/080403.

*Primary Examiner* — Peter D Nolan
*Assistant Examiner* — Peter Y Ning
(74) *Attorney, Agent, or Firm* — Athorus, PLLC

(57) ABSTRACT

Systems and methods to ensure safe driving behaviors in remote driving applications may include a vehicle having an imaging device and a teleoperator station in communication with each other via a network. For example, a safety tunnel having various safety tunnel parameters may be generated based on location data, map data, vehicle data, and/or sensor data. Remote operation of the vehicle may be monitored with respect to the safety tunnel parameters, and various visual, audio, and/or haptic alerts or feedback may be presented or emitted for the teleoperator to encourage or enforce vehicle operation within the safety tunnel parameters. Further, various autonomous remote operation programs or control routines may be initiated or instructed to ensure safe driving behaviors of the vehicle based on the safety tunnel parameters.

20 Claims, 10 Drawing Sheets

(56) References Cited

U.S. PATENT DOCUMENTS

| | | | |
|---|---|---|---|
| 2019/0385460 A1* | 12/2019 | Magzimof | G08G 1/207 |
| 2020/0183394 A1* | 6/2020 | Lockwood | G06N 7/00 |
| 2020/0302951 A1* | 9/2020 | Deng | G08B 1/08 |
| 2020/0333778 A1* | 10/2020 | Lambert | G05D 1/0038 |
| 2021/0144152 A1* | 5/2021 | Gogna | B60W 60/005 |
| 2022/0388536 A1* | 12/2022 | Kothbauer | G05D 1/0038 |
| 2023/0133577 A1* | 5/2023 | Larsson | G05D 1/0027 |
| | | | 701/26 |
| 2024/0036566 A1* | 2/2024 | Moser | G05D 1/0016 |
| 2024/0103513 A1* | 3/2024 | Gordon | G05D 1/82 |

* cited by examiner

SYSTEMS AND METHODS TO ENSURE SAFE DRIVING BEHAVIORS ASSOCIATED WITH REMOTE

BACKGROUND

Teleoperated remote driving of a vehicle may be considered a transient technology toward fully autonomous driving. In such remote driving applications, a teleoperator may use a teleoperator station to remotely drive the vehicle via a wireless communication network. To facilitate such remote driving applications, a live video stream representing a view of the vehicle's environment may be captured, transmitted, and presented to a teleoperator at the teleoperator station. However, the live video stream may provide limited awareness of the environment around the vehicle, including roadways, turns, intersections, obstacles, pedestrians, cyclists, other vehicles, or other structures or objects. Accordingly, there is a need for systems and methods to increase environment awareness and ensure safe driving behaviors to enable safe and reliable teleoperated remote driving of vehicles.

DETAILED DESCRIPTION

Figure 1:
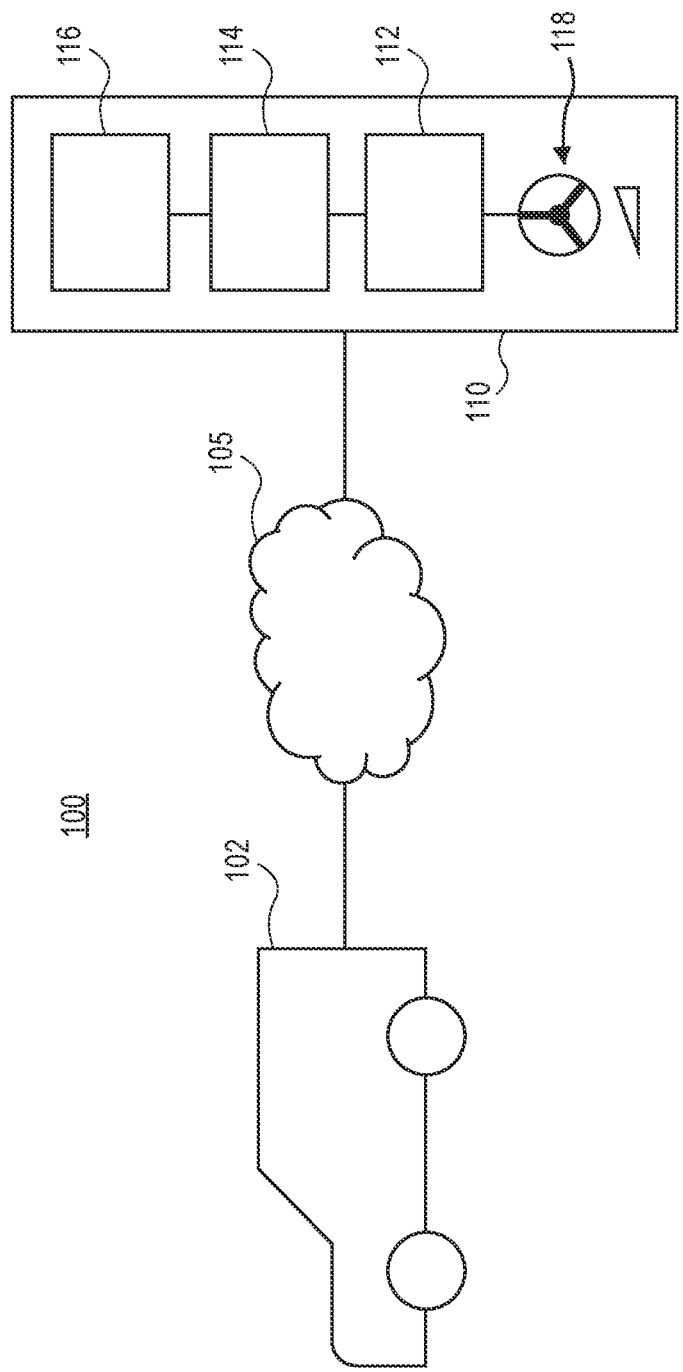
FIG. 1 is a schematic diagram of an example remote driving system, in accordance with implementations of the present disclosure.

As is set forth in greater detail below, implementations of the present disclosure are directed to systems and methods to increase environment awareness to enable safe and reliable teleoperated remote driving of vehicles. In addition, implementations of the present disclosure are directed to systems and methods to ensure safe driving behaviors to enable safe and reliable teleoperated remote driving of vehicles.

In example embodiments of remote driving applications, a teleoperator may use a teleoperator station to remotely drive a vehicle within an environment via a wireless communication network. One or more imaging devices or sensors associated with the vehicle may capture a live video stream representing a view of the vehicle's environment. The live video stream may then be transmitted, processed, and presented to a teleoperator at the teleoperator station. At the teleoperator station, the teleoperator may view the live video stream and remotely drive the vehicle by using a control interface of the teleoperator station to generate drive control commands. Then, the drive control commands may be processed and transmitted from the teleoperator station to the vehicle, and the vehicle may receive, process, and execute the drive control commands.

In addition, the vehicle may include various other types of sensors to capture data associated with the environment, such as audio sensors, depth sensors, infrared sensors, other types of imaging sensors, radar sensors, light detection and ranging (LIDAR) sensors, other types of time of flight sensors, and/or various other types of sensors. Various data captured by one or more sensors onboard the vehicle may be provided, presented, or emitted for the teleoperator. However, it may be difficult or challenging for a teleoperator to filter the combination of the various data, in order to discern objects or portions of the environment that may be of interest to maintain safety and safe driving behaviors. Further, some objects or portions of the environment that may be of interest to maintain safety and safe driving behaviors may not be readily apparent based on the combination of various data provided, presented, or emitted for the teleoperator.

In example embodiments, one or more audio sensors or arrays may capture audio data associated with objects or portions of the environment around the vehicle. The audio data may be processed to identify sounds and determine relevant objects, e.g., objects that may be of interest to maintain safety, associated with the identified sounds. In addition, the audio data associated with relevant objects may be further processed to determine locations of the objects relative to the vehicle. Based on the identified sounds and relative locations of the relevant objects, one or more visualizations, e.g., alerts or notifications, of the relevant objects may be presented to the teleoperator to increase awareness of such objects. Further, the identified sounds associated with the relevant objects may also be amplified, synthesized, and/or emitted to the teleoperator to further increase awareness of such objects.

In additional example embodiments, one or more imaging devices or sensors may capture imaging data associated with objects or portions of the environment around the vehicle. The imaging data may be processed to identify objects and determine relevant objects, e.g., objects that may be of interest to maintain safety, associated with the identified objects. In addition, the imaging data associated with relevant objects may be further processed to determine locations of the objects relative to the vehicle. Based on the relative locations of the relevant objects, one or more visual indicators, e.g., alerts or notifications, of the relevant objects may be presented to the teleoperator to increase awareness of such objects. Moreover, one or more audio sensors or arrays may capture audio data associated with the relevant objects at the relative locations within the environment. The audio data may be processed to identify and extract sounds associated with the relevant objects at the relative locations.

Further, the identified sounds associated with the relevant objects may also be amplified, synthesized, and/or emitted to the teleoperator to further increase awareness of such objects.

In further example embodiments, position or location sensors of the vehicle may detect a current location and transmit the current location to the teleoperator station. In addition, the teleoperator station may receive sensor data associated with objects or portions of the environment from various sensors onboard the vehicle. Based on the location data, known map and roadway data related to the location, known vehicle characteristics associated with the vehicle, and/or sensor data associated with the environment around the vehicle, various safety tunnel parameters may be determined to ensure safe driving behaviors of the vehicle. The safety tunnel parameters may relate to allowable or permissible steering angles, yaw rates, steering torques, speeds, accelerations, changes or combinations thereof, and/or other operational characteristics of the vehicle. Based on the determined safety tunnel parameters, various indicators, alerts, notifications, feedback, and/or other information may be provided to a teleoperator that is remotely driving, instructing, or controlling the vehicle within the environment. In some examples, if the drive state information associated with the vehicle is outside the safety tunnel parameters and/or if commands or instructions received from the teleoperator station are outside the safety tunnel parameters, various partially or substantially fully autonomous driving behaviors may be implemented, commanded, or instructed to ensure safe driving behaviors of the vehicle.

By the systems and methods described herein, various visualizations, indicators, alerts, notifications, sounds, or other indications associated with relevant objects or portions of an environment around a remotely driven vehicle may be processed, emitted, and/or presented to a teleoperator at a teleoperator station, thereby increasing environment awareness and safety associated with the remote operation of the vehicle. Further, various indicators, alerts, notifications, sounds, or other indications associated with safety tunnel parameters for a remotely driven vehicle within an environment may be processed, emitted, and/or presented to a teleoperator at a teleoperator station, thereby ensuring safe driving behaviors during the remote operation of the vehicle.

FIG. 1 is a schematic diagram 100 of an example remote driving system, in accordance with implementations of the present disclosure.

As shown in FIG. 1, the example remote driving system may comprise a vehicle 102 that is adapted to be remotely driven, controlled, or instructed by a teleoperator via a wireless communication network 105. In addition, the example remote driving system may comprise a teleoperator station 110 for use by a teleoperator to remotely drive, control, or instruct the vehicle 102 via the wireless communication network 105.

In example embodiments, the vehicle 102 may comprise a car, such as a small car, a regular car, a Sports Utility Vehicle (SUV), a van, a truck, or any other type of vehicle that is adapted to be remotely driven, controlled, or instructed. In addition, the vehicle 102 may comprise a modified vehicle that includes or provides the required on-board infrastructure for teleoperation. For example, the vehicle 102 may include actuators for controlling the vehicle 102, one or more imaging devices, cameras, or sensors for capturing imaging data of the vehicle's environment, one or more audio sensors or arrays, radar sensors, LIDAR sensors, or other types of sensors for detecting or capturing data associated with the vehicle's environment, one or more sensors to detect or measure drive state information, and/or various interfaces for bi-directional communication with the teleoperator station 110 via the wireless communication network 105.

The actuators for controlling the vehicle 102 may include mechanical actuators that directly actuate the vehicle's steering wheel, acceleration pedal, brakes, and/or other systems or components of the vehicle 102. Alternatively, existing actuators of the vehicle 102 (e.g., for adjusting or controlling speed, acceleration, steering angle, and/or other operational characteristics) may be controlled via an electronic interface associated with the vehicle 102.

The imaging devices or cameras associated with the vehicle 102 may comprise various types of imaging sensors, analog cameras, digital cameras, video cameras, depth sensors, infrared sensors, time-of-flight sensors, or other types of imaging sensors. The imaging devices or cameras may be positioned and oriented at various positions on the vehicle 102 in order to capture imaging data of an environment at least partially around the vehicle 102, e.g., towards a forward movement direction, towards a rearward movement direction, and/or toward various other portions of a periphery of the vehicle 102. In addition, the imaging devices or cameras may capture imaging data, such as video data, live video streams, or other types of imaging data, which may be transmitted to the teleoperator station 110 and used to increase environment awareness and ensure safe driving behaviors, as further described herein.

The audio sensors or arrays associated with the vehicle 102 may comprise various types of microphones, microphone arrays, audio transducers, piezoelectric elements, and/or other types of audio sensors. The audio sensors or arrays may be positioned and oriented at various positions on the vehicle 102 in order to detect and capture audio data of an environment at least partially around the vehicle 102. In some examples, an audio sensor array or microphone array may be beamformed to detect and capture audio data at particular desired positions or locations relative to the vehicle 102. In addition, the beamforming of the audio sensor array or microphone array may be modified or changed over time to detect and capture audio data at different desired positions or locations relative to the vehicle 102 over time. For example, the different desired positions or locations relative to the vehicle 102 at which to detect and capture audio data by the beamformed audio sensor array or microphone array may include a forward movement direction, left and right corners or sides toward a forward movement direction, a rearward movement direction, left and right corners or sides toward a rearward movement direction, e.g., sometimes referred to as blind spots, and/or other positions or locations relative to the vehicle 102. In addition, the audio sensors or arrays may capture audio data, such as voices, speech, shouting, crying, laughing, footsteps, bicycle geartrains, tire or road noise, vehicles, engines, motors, or other types of sounds or audio data, which may be transmitted to the teleoperator station 110 and used to increase environment awareness and ensure safe driving behaviors, as further described herein.

The sensors to detect or measure drive state information of the vehicle 102 may comprise various types of sensors configured to detect speed, acceleration, steering angle, yaw rate, steering torque, and/or other operational characteristics of the vehicle 102. For example, a first sensor such as a speedometer or encoder may measure a drive speed of the vehicle 102, a second sensor such as an accelerometer, pressure sensor, or encoder may measure pedal actuation, acceleration, deceleration, or braking of the vehicle 102, and/or a third sensor such as an encoder or position/orientation sensor may measure a steering angle, yaw rate, steering torque, and/or measure an orientation of the vehicle wheels. The drive state information of the vehicle 102 may be transmitted to the teleoperator station 110, and may be used to facilitate generation of safety tunnel parameters and ensure safe driving behaviors, as further described herein.

The interfaces for bi-directional communication with the teleoperator station 110 may enable transmission of imaging data, audio data, other sensor data, location data, vehicle data, various other data, as well as transmission of drive state information associated with the vehicle 102, from the vehicle 102 to the teleoperator station 110 via the wireless communication network 105. In addition, the interfaces for bi-directional communication with the teleoperator station 110 may enable receipt of drive control commands, safety tunnel parameters, partially or substantially fully autonomous drive commands or instructions, and/or other data, information, commands, or instructions from the teleoperator station 110 via the wireless communication network 105.

In example embodiments, the wireless communication network 105 may comprise a network that allows for bi-directional transmission of data between the vehicle 102 and the teleoperator station 110. For example, the network 105 may be a fourth generation (4G) wireless communication network, a fifth generation (5G) wireless communication network, or other types of wireless communication networks.

Various data or information may be transmitted via the network 105, including imaging data, audio data, other sensor data, location data, vehicle data, drive state information, and/or various other data associated with the vehicle 102, e.g., from the vehicle 102 to the teleoperator station 110, as well as drive control commands, safety tunnel parameters, partially or substantially fully autonomous drive commands or instructions, and/or other data, information, commands, or instructions, e.g., from the teleoperator station 110 to the vehicle 102 via the wireless communication network 105. The drive state information may comprise data or information related to speed, acceleration, steering angle, yaw rate, steering torque, and/or other operational data or characteristics associated with the vehicle 102. In addition, the safety tunnel parameters may comprise data or information related to allowable or permissible speeds, accelerations, steering angles, yaw rates, steering torques, and/or other operational commands, instructions, or changes associated with the vehicle 102. Further, additional data may be exchanged between the vehicle 102 and the teleoperator station 110, such as time synchronization information including data transmission timestamps.

In example embodiments, the teleoperator station 110 may comprise a communication unit 112 configured to send and receive data or information to and from the vehicle 102 via the network 105, a processor or processing unit 114 configured to process various data and generate visualizations or visual indicators of relevant objects, amplify or synthesize sounds associated with relevant objects, and/or determine safety tunnel parameters to ensure safe driving behaviors, a presentation or display device 116 configured to present, emit, or provide the imaging data, visualizations or visual indicators of relevant objects, sounds associated with relevant objects, and/or indicators or feedback associated with safety tunnel parameters to a teleoperator using the teleoperator station 110, and a control interface 118 configured to receive drive control commands and/or other inputs or instructions from the teleoperator using the teleoperator station 110.

The communication unit 112 may comprise various types of communication systems, devices, antenna, interfaces, or other data transmit/receive units configured to enable wireless communication between the teleoperator station 110 and the vehicle 102 via the wireless communication network 105. As described herein, the communication unit 112 may receive imaging data, audio data, other sensor data, location data, vehicle data, drive state information, and/or various other data from the vehicle 102, and may transmit drive control commands, safety tunnel parameters, partially or substantially fully autonomous drive commands or instructions, and/or other data to the vehicle 102.

The processor 114 may comprise a processing unit, graphics processing unit, or other types of processors configured to process the various data that is received and/or sent between the vehicle 102 and teleoperator station 110 via the network 105. For example, as further described herein, the processor 114 may receive audio data, process the audio data to determine relevant objects and their relative locations, and generate visualizations of the relevant objects, as well as amplify, synthesize, and/or cause emission of sounds associated therewith. In addition, as further described herein, the processor 114 may receive imaging data, e.g., video data or live video streams, process the imaging data to determine relevant objects and their relative locations, and generate visual indicators of the relevant objects, as well as extract, amplify, synthesize, and/or cause emission of sounds associated therewith.

Further, as further described herein, the processor 114 may receive various data, such as location data, drive state information, map data, vehicle data, sensor data, and/or other data, process the data to determine safety tunnel parameters for safe operation of the vehicle, generate indicators related to the safety tunnel parameters, and/or command or instruct various actions by the vehicle to ensure safe driving behaviors. In addition, the processor 114 may receive and process drive control commands received from a teleoperator associated with the teleoperator station 110, such that the drive control commands can be transmitted to the vehicle 102 via the network 105 in order to remotely drive, control, or instruct various systems or components of the vehicle 102.

The presentation device 116 may comprise one or more monitors, screens, projectors, display devices, head-mounted displays, augmented reality displays, other types of presentation devices, speakers, audio output devices, haptic feedback or output devices, and/or other types of feedback or output devices. For example, the presentation device 116 may receive and present, render, or display the imaging data, e.g., video data or live video streams, received from the vehicle 102. In addition, the presentation device 116 may receive visualizations or visual indicators of relevant objects generated by the processor 114, and may present, render, or overlay the visualizations or visual indicators of relevant objects within or onto the imaging data. Further, the presentation device 116 may receive and extract, amplify, synthesize, and/or emit sounds or other audio data associated with relevant objects. Moreover, the presentation device 116 may emit various other indicators, e.g., visual, audio, haptic, or other types of feedback, based on the safety tunnel parameters to ensure safe driving behaviors. The presentation device 116 may present, emit, or provide the various imaging data, visualizations, sounds, audio data, feedback, or other indicators, such that a teleoperator at the teleoperator station 110 may have an increased awareness of an environment around the vehicle 102 and maintain safe driving behaviors while driving, controlling, or instructing operations of the vehicle 102.

The control interface 118 may comprise a steering wheel, acceleration pedal, brake pedal, transmission selector, and/or various other interface components to generate drive control commands for the vehicle 102. In addition, the control interface 118 may include components, elements, or interfaces to control or instruct various other aspects of the vehicle 102, such as lights, turn indicators, windshield wipers, power windows, power doors, climate control systems, entertainment or infotainment systems, and/or various other systems, devices, or accessories associated with the vehicle 102. The control interface 118 may receive drive control commands provided or input by a teleoperator at the teleoperator station 110, which may then be processed and/or transmitted to the vehicle 102 via the network 105.

Although FIG. 1 illustrates an example remote driving system having a particular number, type, configuration, and arrangement of various components, other example embodiments may include various other numbers, types, configurations, and arrangements of the various components. For example, one or more vehicles may be in communication with one or more teleoperator stations, various types of wireless communication networks may be used to facilitate communication between vehicles and teleoperator stations, and/or various other modifications may be made in other example embodiments of the example remote driving system.

Figure 2:
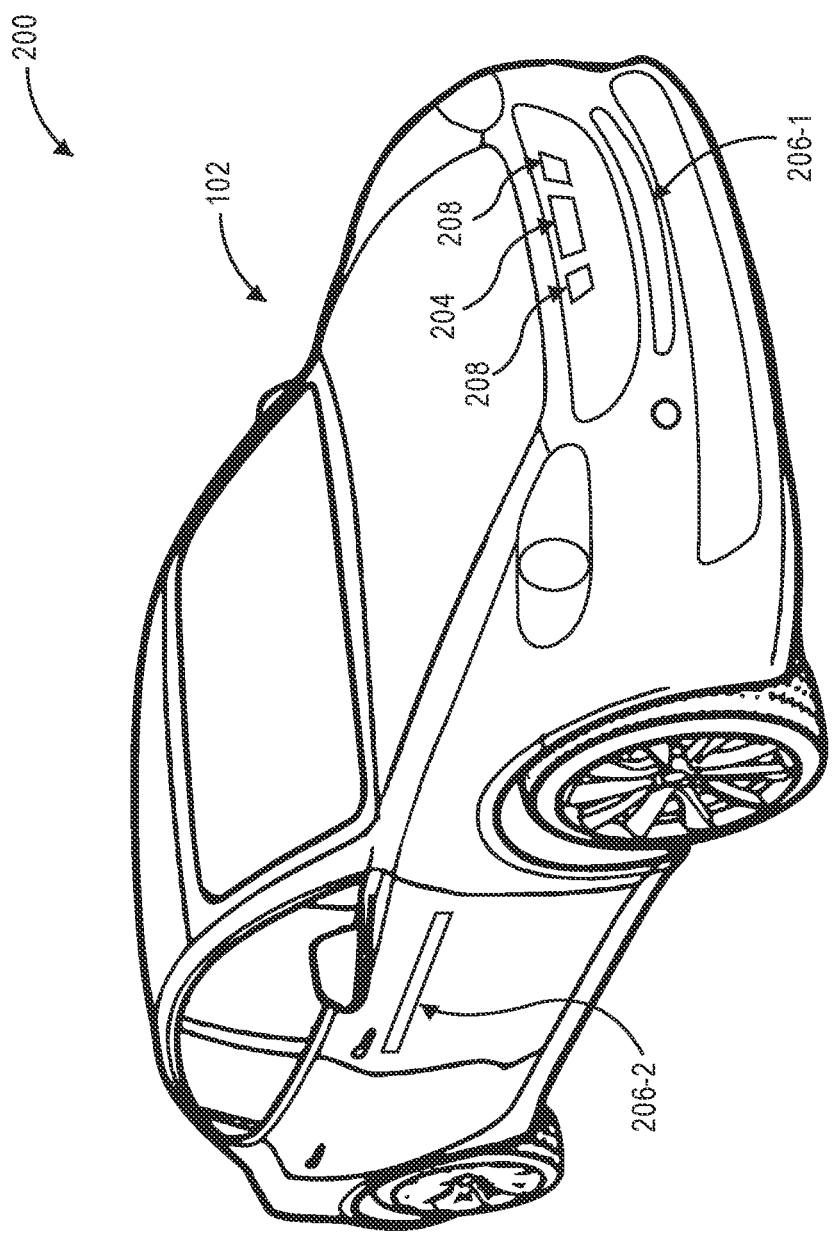
FIG. 2 is a schematic diagram of an example vehicle adapted for remote driving applications, in accordance with implementations of the present disclosure.

FIG. 2 is a schematic diagram 200 of an example vehicle adapted for remote driving applications, in accordance with implementations of the present disclosure. The example vehicle 102 illustrated in FIG. 2 may include any and all of the features of the vehicle 102 described herein at least with respect to FIG. 1.

For example, the vehicle 102 may include various types of sensors to detect or capture data associated with various objects or portions of an environment around the vehicle, including one or more imaging devices, cameras, or sensors 204 for capturing imaging data of the vehicle's environment, and/or one or more audio sensors or arrays 206, radar sensors, LIDAR sensors, or other types of sensors 208 for detecting or capturing data associated with the vehicle's environment.

In example embodiments, the imaging devices or cameras 204 associated with the vehicle 102 may comprise various types of imaging sensors, analog cameras, digital cameras, video cameras, depth sensors, infrared sensors, time-of-flight sensors, or other types of imaging sensors. The imaging devices or cameras 204 may be positioned and oriented at various positions on the vehicle 102 in order to capture imaging data of an environment at least partially around the vehicle 102, e.g., towards a forward movement direction, towards a rearward movement direction, and/or toward various other portions of a periphery of the vehicle 102. In addition, the imaging devices or cameras may capture imaging data, such as video data, live video streams, or other types of imaging data, which may be transmitted to the teleoperator station 110 and used to increase environment awareness and ensure safe driving behaviors, as further described herein.

In the example of FIG. 2, the imaging devices 204 may be positioned toward a forward portion of the vehicle 102 in order to capture imaging data of an environment toward a forward movement direction of the vehicle 102. Although not illustrated in FIG. 2, various additional imaging devices may be positioned at other portions of the vehicle 102 to capture imaging data of the environment toward other directions relative to the vehicle, e.g., toward a rearward movement direction, toward lateral sides or corners of the vehicle, or any other directions.

Furthermore, imaging data that is captured by the imaging devices 204 may be processed to identify objects, and also to identify locations of objects within the imaging data relative to the vehicle 102. For example, the relative locations of objects within imaging data may be determined based on known positions, orientations, and fields of view of the imaging devices 204 relative to the vehicle.

In example embodiments, the audio sensors or arrays 206-1, 206-2 associated with the vehicle 102 may comprise various types of microphones, microphone arrays, audio transducers, piezoelectric elements, and/or other types of audio sensors. The audio sensors or arrays 206-1, 206-2 may be positioned and oriented at various positions on the vehicle 102 in order to detect and capture audio data of an environment at least partially around the vehicle 102, e.g., towards a forward movement direction, towards a rearward movement direction, and/or toward various other portions of a periphery of the vehicle 102. In addition, the audio sensors or arrays 206-1, 206-2 may capture audio data, such as voices, speech, shouting, crying, laughing, footsteps, bicycle geartrains, tire or road noise, vehicles, engines, motors, or other types of sounds or audio data, which may be transmitted to the teleoperator station 110 and used to increase environment awareness and ensure safe driving behaviors, as further described herein.

In the example of FIG. 2, a first audio sensor or array 206-1 may be positioned and oriented toward a forward portion of the vehicle 102 in order to capture audio data of an environment toward a forward movement direction of the vehicle 102. In addition, a second audio sensor or array 206-2 may be positioned and oriented toward a lateral portion of the vehicle 102 in order to capture audio data of an environment toward a lateral direction relative to the vehicle 102. Although not illustrated in FIG. 2, various additional audio sensors or arrays may be positioned at other portions of the vehicle 102 to capture audio data of the environment toward other directions relative to the vehicle, e.g., toward a rearward movement direction, toward lateral sides or corners of the vehicle, or any other directions.

In some examples, an audio sensor array or microphone array 206 may be beamformed to detect and capture audio data at particular desired positions or locations relative to the vehicle 102. In addition, the beamforming of the audio sensor array or microphone array 206 may be modified or changed over time to detect and capture audio data at different desired positions or locations relative to the vehicle 102 over time. For example, the different desired positions or locations relative to the vehicle 102 at which to detect and capture audio data by the beamformed audio sensor array or microphone array may include a forward movement direction, left and right corners or sides toward a forward movement direction, a rearward movement direction, left and right corners or sides toward a rearward movement direction, e.g., sometimes referred to as blind spots, and/or other positions or locations relative to the vehicle 102.

Furthermore, audio data that is captured by an audio sensor array or microphone array 206 may be processed to identify sounds, and also to identify locations of objects associated with the sounds in the environment relative to the vehicle 102. For example, the relative locations of objects in the environment may be determined based on known positions and orientations of individual audio sensors or microphones of an array relative to the vehicle, as well as relative times of receipt of audio data by the individual audio sensors or microphones of an array.

In example embodiments, various other sensors 208 associated with the vehicle 102 may comprise various types of depth sensors, radar sensors, LIDAR sensors, or other types of time-of-flight sensors. The sensors 208 may also be positioned and oriented at various positions on the vehicle 102 in order to capture data of an environment at least partially around the vehicle 102, e.g., towards a forward movement direction, towards a rearward movement direction, and/or toward various other portions of a periphery of the vehicle 102. In addition, the sensors 208 may capture various types of data, which may be transmitted to the teleoperator station 110 and used to increase environment awareness and ensure safe driving behaviors, as further described herein.

In the example of FIG. 2, the various other sensors 208 may be positioned toward a forward portion of the vehicle 102 in order to capture data of an environment toward a forward movement direction of the vehicle 102. Although not illustrated in FIG. 2, various additional sensors 208 may be positioned at other portions of the vehicle 102 to capture data of the environment toward other directions relative to the vehicle, e.g., toward a rearward movement direction, toward lateral sides or corners of the vehicle, or any other directions.

Furthermore, data that is captured by the other sensors 208 may be processed to identify distances or ranges to objects, and also to identify locations of objects within the data relative to the vehicle 102. For example, the relative locations of objects within the data may be determined based on known positions, orientations, and fields of sensing or view of the sensors 208 relative to the vehicle.

Figure 3:
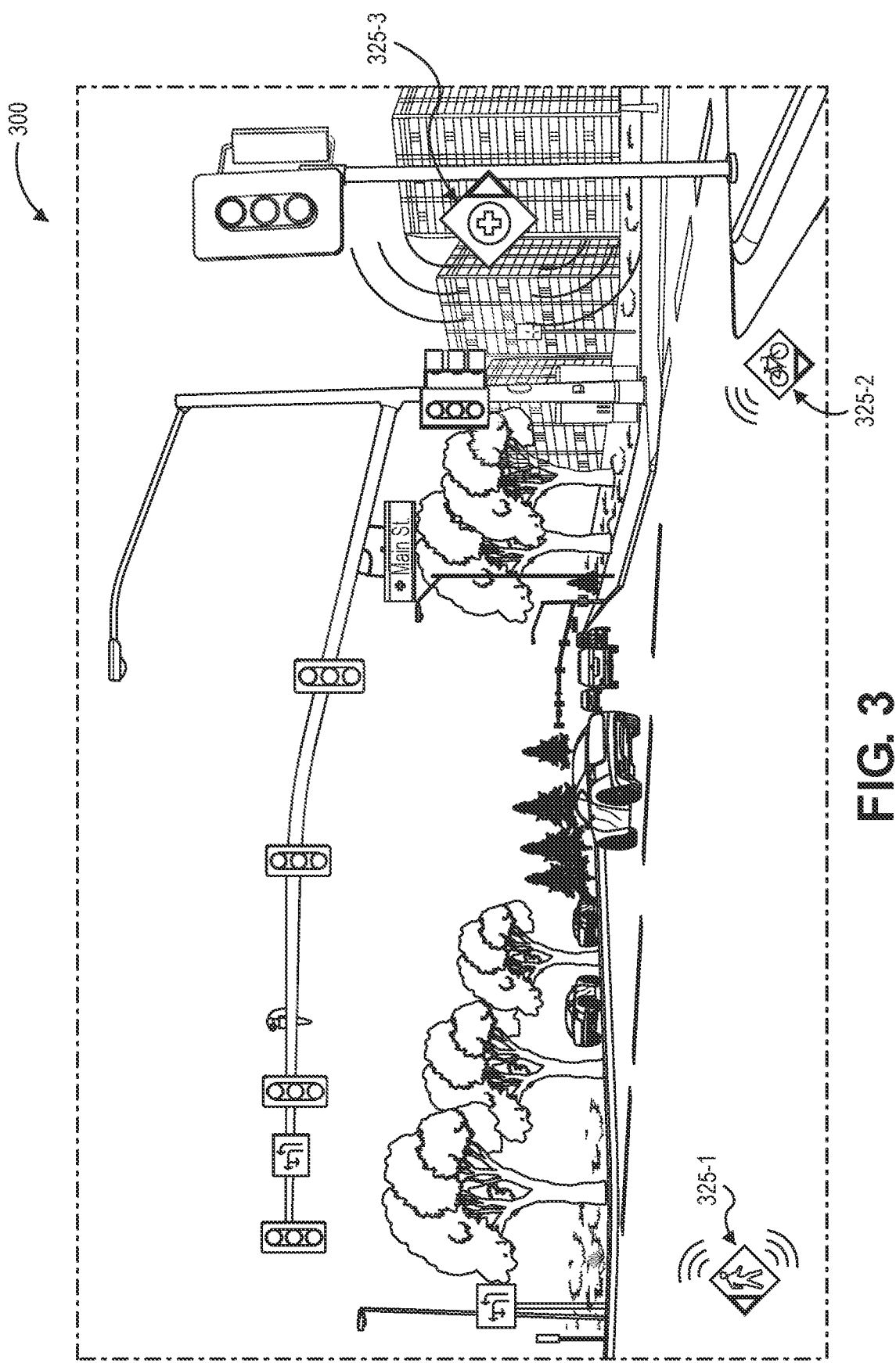
FIG. 3 is a schematic diagram of an example video data including audio-based visual notifications to increase environment awareness, in accordance with implementations of the present disclosure.

FIG. 3 is a schematic diagram 300 of an example video data including audio-based visual notifications to increase environment awareness, in accordance with implementations of the present disclosure.

As illustrated in the example of FIG. 3, a visual map and/or visual notifications may be generated and presented within or overlaid onto imaging data for a teleoperator at a teleoperator station. In example embodiments, the visual map and/or visual notifications may augment the imaging data based on audio data associated with unseen or peripheral objects in the environment, e.g., objects that may not be within a field of view of imaging devices or sensors onboard the vehicle but may nevertheless be proximate to the vehicle. In addition, audio data associated with unseen or peripheral objects may also be amplified, synthesized, and/or emitted for the teleoperator at the teleoperator station, in order to further increase environment awareness of the teleoperator and ensure safe remote operation of the vehicle.

In example embodiments, audio data may be captured by audio sensors, microphones, and/or arrays onboard a vehicle within an environment. The audio data may be associated with people, pedestrians, bicycles, motorcycles, vehicles, animals, and/or various other types of objects within an environment. The audio data may be received by a processor, e.g., a processing unit associated with a teleoperator station, and the processor may process the audio data to identify one or more sounds. The processing of the audio data may be performed using various types of algorithms or techniques, such as pattern matching algorithms, machine learning models, neural networks, and/or other types of processing algorithms.

Based on the processing of the audio data, one or more relevant objects may be determined that are associated with identified sounds. The processing algorithms may filter out sounds that may be associated with background noise, wind noise, or other types of audio data that do not correspond to known or identified sounds. In this manner, relevant objects associated with identified sounds may be determined. For example, relevant objects may include people, pedestrians, bicycles, motorcycles, vehicles, animals, dynamic or moving objects, and/or various other types of objects within an environment.

In addition, the audio data may be further processed to determine locations of the identified sounds relative to the vehicle in the environment. In some examples, audio sensor arrays or microphone arrays may be beamformed to detect and capture audio data associated with desired positions or locations relative to the vehicle, such that identified sounds associated with such audio data may be logically associated with the beamformed positions or locations relative to the vehicle. In other examples, audio data that is captured by audio sensor arrays or microphone arrays may be processed to determine times of receipt of identified sounds by individual sensors or microphones of an array, in order to determine positions or locations of identified sounds relative to the vehicle.

In some example embodiments, additional sensor data, e.g., captured by imaging devices and/or other sensors onboard the vehicle, may also be processed to identify or determine objects associated with identified sounds within the audio data, as well as positions or locations of such objects. In this manner, the various sensor data may be fused or combined to identify sounds and determine objects associated with such identified sounds with higher confidence.

Based on the identified sounds, relevant objects associated with such sounds, and relative positions of such objects within the environment, visualizations or visual indications 325 of such objects may be generated and presented within or overlaid onto imaging data for a teleoperator. In the example of FIG. 3, sounds associated with various objects may have been identified, including sounds associated with a pedestrian, a bicyclist, and a vehicle.

For example, sounds associated with a pedestrian may include footsteps, voice or speech, or other related sounds, and a location of the pedestrian sounds may be determined to be left of a forward movement direction of the vehicle. As a result, a visualization 325-1 related to a pedestrian within an environment may be presented toward a left side within or overlaid onto the imaging data. In addition, sounds associated with a bicyclist may include tire or road noise, bicycle geartrain, shifting of gears, voice or speech, or other related sounds, and a location of the bicyclist sounds may be determined toward a right lateral side or corner of the vehicle. As a result, a visualization 325-2 related to a bicyclist within an environment may be presented toward a right lateral side or corner within or overlaid onto the imaging data. Further, sounds associated with a vehicle, e.g., a police, fire, ambulance, or other emergency vehicle, may include tire or road noise, engine or motor noise, braking sounds, sirens or horns, or other related sounds, and a location of the vehicle sounds may be determined to be right of a forward movement direction of the vehicle. As a result, a visualization 325-3 related to a vehicle within an environment may be presented toward a right side within or overlaid onto the imaging data.

The visualizations 325 of the identified sounds and relevant objects may be presented with various aspects or characteristics. For example, the visualizations 325 may include various text, characters, symbols, arrows, object point clouds, bounding boxes, or other aspects. In addition, the visualizations 325 may be presented with various visual effects, such as various sizes, colors, brightness, highlighting, flashing, or other visual effects. In some examples, the various characteristics and visual effects associated with the visualizations 325 may be selected based on types, locations, and/or proximity of the relevant objects. For example, visualizations 325 that are closer to the vehicle may be presented with a larger size, in a color that is bright red, with accelerated flashing, or other characteristics and visual effects, whereas visualizations 325 that are farther away from the vehicle may be presented with a smaller size, in a color that is light green or yellow, with no flashing, or other characteristics and visual effects.

As a result, various types of visualizations 325 of objects, such as pedestrians or bicyclists, may be presented with various characteristics and visual effects to increase awareness of such objects and maintain safety of the pedestrians and bicyclists during remote operation of the vehicle. In addition, other types of visualizations 325 of objects, such as motor vehicles or emergency vehicles, may be presented with various other characteristics and visual effects to increase awareness of such objects and maintain safe operation of the vehicle relative to other vehicles. Further, visualizations 325 of objects that may be closer or proximate to the vehicle may be presented with various further characteristics and visual effects that may suggest greater urgency or importance of awareness by the teleoperator of such objects.

Furthermore, in addition to presenting visualizations or visual indications 325 of relevant objects associated with identified sounds within an environment, various sounds associated with the relevant objects may also be emitted for a teleoperator at a teleoperator station. For example, the identified sounds may be amplified and emitted to increase awareness of the teleoperator. In addition or alternatively, one or more sounds that are associated with the relevant objects may be synthesized or generated based on known or recorded sounds of similar objects, and then the synthesized sounds may be emitted to increase awareness of the teleoperator.

Moreover, the sounds associated with relevant objects may be presented with various aspects or characteristics, such as volume or loudness, tone, pitch, frequency, or other aspects. In some examples, the various audio characteristics of sounds associated with the visualizations 325 may be selected based on types, locations, and/or proximity of the relevant objects. For example, sounds associated with various types of objects, e.g., pedestrians or bicyclists, may be amplified and emitted for a teleoperator, whereas sounds associated with other types of objects, e.g., vehicles, may be emitted without amplification. In addition, sounds associated with objects that are closer to the vehicle may be emitted with greater amplification and/or harsher tone, whereas sounds associated with objects that are farther from the vehicle may be emitted with lesser amplification and/or softer tone.

Furthermore, the sounds associated with relevant objects may be presented or emitted via one or more audio output devices as spatial audio, which may include a directionality of the emitted audio that indicates a source or direction of the sounds relative to the vehicle in the environment. In this manner, spatial audio may provide a three-dimensional, positional awareness of a source or direction of sounds to further increase environment awareness by the teleoperator at a teleoperator station.

In further example embodiments, audio sensors, microphones, or arrays associated with a vehicle may be incorporated or combined with various other types of sensors, including imaging sensors or devices, infrared sensors, depth sensors, radar, LIDAR, or other time of flight sensors, or other types of sensors. In one example, a sound camera that includes an imaging sensor, e.g., RGB (red-green-blue) camera, and a microphone array may be used to detect and capture both audio and imaging data associated with objects around a vehicle within an environment. Based on sounds identified from audio data captured by the microphone array of the sound camera, relevant objects captured within imaging data by the imaging sensor of the sound camera may be identified, and one or more visualizations may be presented in association with the relevant objects, such as object point clouds, bounding boxes, or other symbols, text, or indicia. Further, the visualizations may be presented with various characteristics and visual effects as described herein. In other examples, audio sensors, microphones, or arrays may be incorporated or combined with various other types of sensors to identify sounds, determine relevant objects, present visualizations of such objects, and emit sounds associated with such objects, in order to increase environment awareness.

In still further example embodiments that present and/or emit imaging data, audio data, and visualizations or visual indicators using an augmented or extended reality helmet, headset, or wearable device, a direction of a teleoperator's eyes or gaze may be determined or measured using various sensors or imaging devices of the wearable device. Based on the eye or gaze tracking of a teleoperator, positions, locations, and visual characteristics of visualizations or visual indicators may be modified to appropriately alert or notify the teleoperator of identified sounds and relevant objects. For example, visualizations that may be within a field of view of a teleoperator's eye or gaze direction may be presented at such locations, whereas visualizations that may not be within a field of view of a teleoperator's eye or gaze direction may be moved or shifted to be presented at locations within or closer to a teleoperator's eye or gaze direction. Further, spatial direction and audio characteristics of emitted audio of the identified sounds may also be modified to appropriately alert or notify the teleoperator of identified sounds and relevant objects. For example, based on a teleoperator's eye or gaze direction, directionality of emitted sounds may need to be changed or modified, and/or other audio characteristics such as volume, pitch, tone, or other aspects may also be changed based on a teleoperator's eye or gaze direction.

Although FIG. 3 illustrates a particular number, type, configuration, and arrangement of visualizations or visual indicators associated with identified sounds and relevant objects, other example embodiments may include various other numbers, types, configurations, or arrangements of visualizations or visual indicators associated with identified sounds and relevant objects. For example, various other types of sounds may be identified that are associated with various other types of objects, other numbers or types of visualizations may be presented, visualizations may have various other shapes, sizes, locations, and/or other visual characteristics or effects, and/or various other modifications may be made in additional example embodiments.

Figure 4:
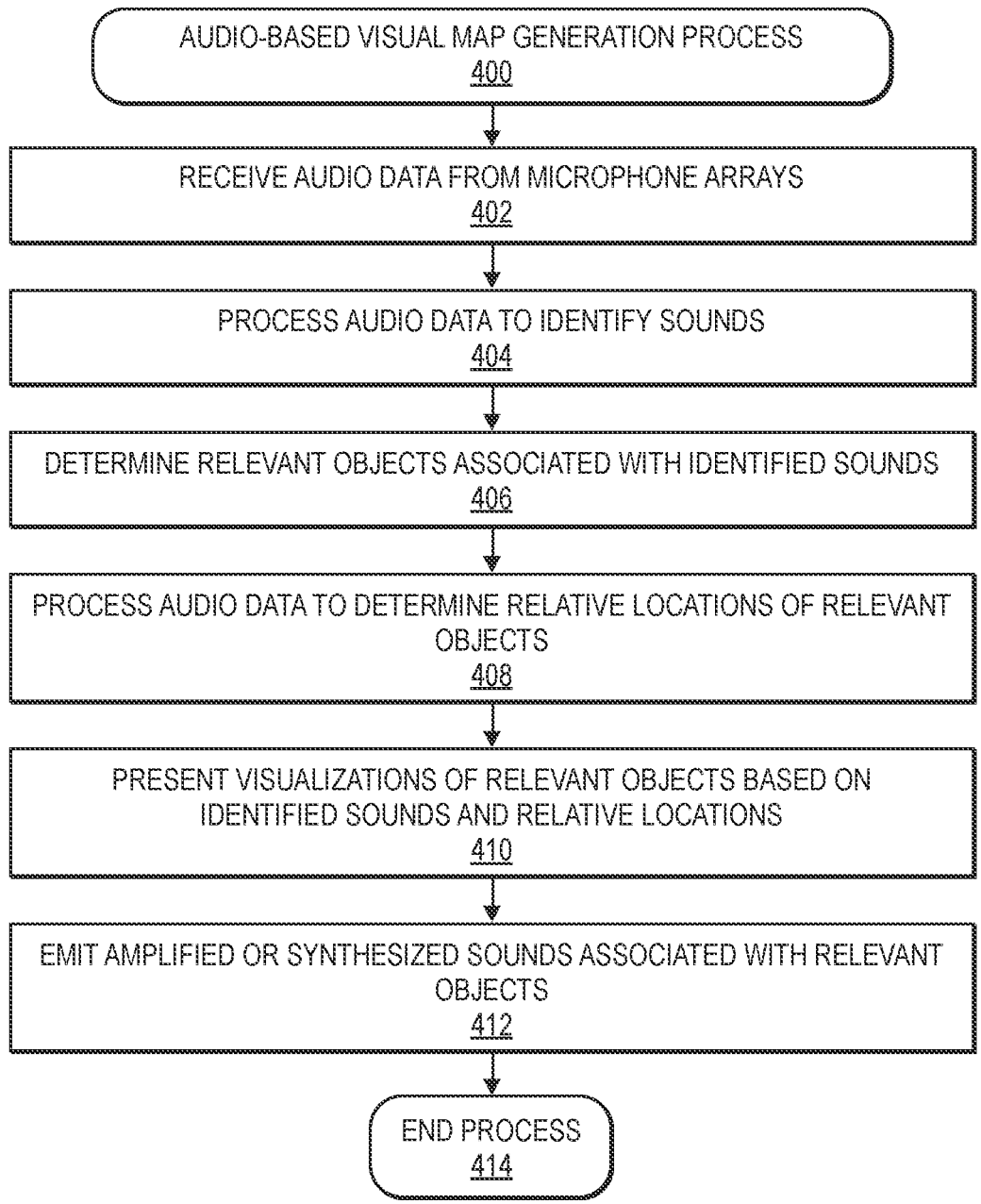
FIG. 4 is a flow diagram illustrating an example audio-based visual map generation process, in accordance with implementations of the present disclosure.

FIG. 4 is a flow diagram illustrating an example audio-based visual map generation process 400, in accordance with implementations of the present disclosure.

The process 400 may begin by receiving audio data from one or more microphone arrays, as at 402. The audio sensor or microphone arrays may be associated with a vehicle within an environment, and may capture audio data from the environment around the vehicle. In some examples, the microphone arrays may be beamformed to detect and capture audio data at desired locations or positions relative to the vehicle. In other examples, the microphone arrays may not be beamformed and may detect and capture audio data around the vehicle, which audio data may be later processed to determine locations of identified sounds relative to the vehicle. The audio data may comprise sounds associated with various types of objects within an environment, including people, pedestrians, bicycles, motorcycles, vehicles, animals, and/or various other types of objects. Further, a processor may receive the audio data captured by one or more microphone arrays.

The process 400 may continue by processing the audio data to identify sounds, as at 404. For example, various processing algorithms or techniques, such as pattern matching algorithms, machine learning models, neural networks, or other processing algorithms or techniques may process the audio data to identify known or recognized sounds. The processing algorithms may have been trained with various training data in order to recognize sounds associated with various types of objects. Further, a processor may process the audio data to identify sounds.

The process 400 may proceed by determining relevant objects associated with the identified sounds, as at 406. For example, based on the identification of known or recognized sounds within the audio data, objects associated with the known or recognized sounds may be determined. The processing algorithms may also have been trained with various training data in order to determine objects associated with various identified sounds. Alternatively, one or more data stores, tables, lookup tables, or other data storage devices may include associations between identified sounds and relevant objects. Further, a processor may determine relevant objects associated with identified sounds.

The process 400 may then continue to process the audio data to determine relative locations of the relevant objects, as at 408. For example, if the audio data is captured by an audio sensor or microphone array that is beamformed toward a desired location relative to the vehicle, a location of the relevant object associated with the identified sounds may be assumed or determined to coincide or correspond to the beamformed, desired location. Alternatively, the audio data captured by an audio sensor or microphone array may be processed to determine a location of the identified sounds relative to the vehicle, e.g., based on times of receipt by individual sensors or microphones of the identified sounds. Further, a processor may process the audio data to determine relative locations of the relevant objects.

The process 400 may proceed to present visualizations of the relevant objects based on the identified sounds and relative locations, as at 410. For example, visualizations or visual indicators of the relevant objects, including various visual characteristics or effects, may be presented within or overlaid onto imaging data for a teleoperator at a teleoperator station. The visualizations may also be presented via a presentation device at locations that may be associated with or proximate the determined locations of the objects relative to the vehicle in the environment. Further, a processor may cause presentation of visualizations of the relevant objects based on the identified sounds and relative locations.

The process 400 may continue with emitting amplified or synthesized sounds associated with the relevant objects, as at 412. For example, the identified sounds may be amplified and emitted for presentation to a teleoperator. In addition or alternatively, one or more sounds associated with the relevant objects may be synthesized or generated for emission to the teleoperator. Moreover, various audio characteristics of the identified or synthesized sounds may be modified or adjusted based on aspects of the relevant objects and/or identified sounds. Further, a processor may cause emission of amplified or synthesized sounds associated with the relevant objects.

The process 400 may then end, as at 414.

Using the process described at least with respect to FIG. 4, audio data may be processed to identify sounds, determine relevant objects, and determine relative locations of such relevant objects. Then, visualizations or visual indicators of the relevant objects may be generated and presented based on the identified sounds and relative locations, and amplified or synthesized sounds associated with the relevant objects may also be emitted. In this manner, a teleoperator at a teleoperator station may receive visual and audio information related to relevant objects, e.g., objects of interest that may be outside or at peripheral portions of a field of view of an imaging device that captures imaging data for the teleoperator, such that the teleoperator may have an increased awareness of the environment around a vehicle and safely operate the vehicle via the teleoperator station.

Figure 5:
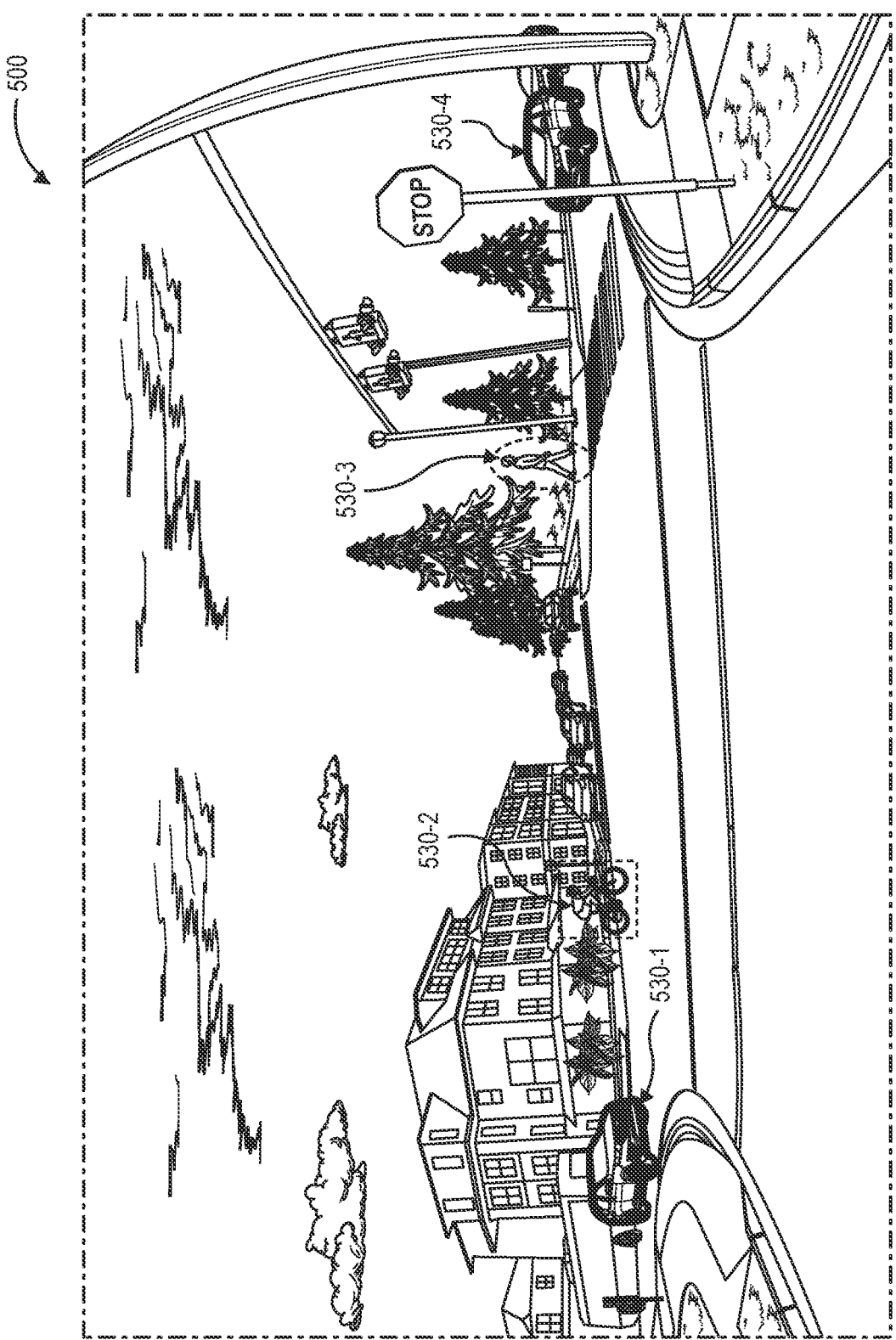
FIG. 5 is a schematic diagram of an example video data including vision-based audio notifications to increase environment awareness, in accordance with implementations of the present disclosure.

FIG. 5 is a schematic diagram 500 of an example video data including vision-based audio notifications to increase environment awareness, in accordance with implementations of the present disclosure.

As illustrated in the example of FIG. 5, a visual map and/or visual notifications may be generated and presented within or overlaid onto imaging data for a teleoperator at a teleoperator station. In example embodiments, the visual map and/or visual notifications may augment the imaging data based on video data associated with unheard, distant, or peripheral objects in the environment, e.g., objects that may be within a field of view of imaging devices or sensors onboard the vehicle but may nevertheless be distant, undetected, or only faintly detectable by audio sensors onboard the vehicle. In addition, audio data associated with unheard, distant, or peripheral objects may also be amplified, synthesized, and/or emitted for the teleoperator at the teleoperator station, in order to further increase environment awareness of the teleoperator and ensure safe remote operation of the vehicle.

In example embodiments, imaging data, e.g., video data or live video streams, may be captured by imaging sensors or devices onboard a vehicle within an environment. The imaging data may include representations of various types of objects in an environment surrounding the vehicle, such as people, pedestrians, bicycles, motorcycles, vehicles, animals, and/or various other types of objects within an environment. The imaging data may be received by a processor, e.g., a processing unit associated with a teleoperator station, and the processor may process the imaging data to identify one or more objects. The processing of the imaging data may be performed using various types of algorithms or techniques, such as pattern matching algorithms, image recognition algorithms, feature recognition algorithms, machine learning models, neural networks, and/or other types of imaging data processing algorithms.

Based on the processing of the imaging data, one or more relevant objects may be determined that are associated with identified objects. The processing algorithms may filter out objects that may be associated with background structures, buildings, roadways, signs, fixtures, clouds, or other types of imaging data that do not correspond to known or identified objects of interest. In this manner, relevant objects among the identified objects may be determined. For example, relevant objects may include people, pedestrians, bicycles, motorcycles, vehicles, animals, dynamic or moving objects, and/or various other types of objects within an environment.

In addition, the imaging data may be further processed to determine locations of the relevant objects relative to the vehicle in the environment. In some examples, imaging data may be processed, e.g., using various imaging data processing algorithms, to determine locations of relevant objects based on known positions, orientations, and/or fields of view of imaging devices onboard the vehicle that captured the imaging data. In other examples, the imaging data may also comprise data from infrared sensors, depth sensors, and/or time of flight sensors, and such imaging data may be processed, e.g., using various imaging data processing algorithms, to determine locations of relevant objects based on known positions, orientations, and/or fields of sensing or view of imaging devices onboard the vehicle that captured the imaging data.

In some example embodiments, additional sensor data, e.g., captured by imaging devices and/or other sensors onboard the vehicle, may also be processed to identify or determine objects within the imaging data, as well as positions or locations of such objects. In this manner, the various sensor data may be fused or combined to identify objects and determine positions and locations of relevant objects with higher confidence.

Based on the identified relevant objects, and relative positions of such objects within the environment, visualizations or visual indications 530 of such objects may be generated and presented within or overlaid onto imaging data for a teleoperator. In the example of FIG. 5, representations of various relevant objects at locations relative to the vehicle may have been identified, including a first vehicle, a bicyclist, a pedestrian, and a second vehicle.

For example, a first vehicle, and/or movement of the first vehicle, may be detected within the imaging data, and a location of the first vehicle may be determined to be left of a forward movement direction of the vehicle. As a result, a visualization 530-1, e.g., including color, highlighting, outlining, flashing, or other visual characteristics or effects, related to the first vehicle within an environment may be presented toward a left side within or overlaid onto the imaging data. In addition, a bicycle or bicyclist, and/or movement thereof, may be detected within the imaging data, and a location of the bicyclist may be determined slightly toward a left forward movement direction of the vehicle. As a result, a visualization 530-2, e.g., including color, highlighting, outlining, flashing, or other visual characteristics or effects, related to the bicyclist within an environment may be presented slightly toward a left forward movement direction within or overlaid onto the imaging data. Further, a pedestrian, and/or movement thereof, may be detected within the imaging data, and a location of the pedestrian may be determined slightly toward a right forward movement direction of the vehicle. As a result, a visualization 530-3, e.g., including color, highlighting, outlining, flashing, or other visual characteristics or effects, related to the pedestrian within an environment may be presented slightly toward a right forward movement direction within or overlaid onto the imaging data. Moreover, a second vehicle, and/or movement of the second vehicle, may be detected within the imaging data, and a location of the second vehicle may be determined to be right of a forward movement direction of the vehicle. As a result, a visualization 530-4, e.g., including color, highlighting, outlining, flashing, or other visual characteristics or effects, related to the second vehicle within an environment may be presented toward a right side within or overlaid onto the imaging data.

The visualizations 530 of the identified relevant objects may be presented with various aspects or characteristics. For example, the visualizations 530 may include various text, characters, symbols, arrows, object point clouds, bounding boxes, or other aspects. In addition, the visualizations 530 may be presented with various visual effects, such as various sizes, colors, brightness, highlighting, flashing, or other visual effects. In some examples, the various characteristics and visual effects associated with the visualizations 530 may be selected based on types, locations, and/or proximity of the relevant objects. For example, visualizations 530 that are closer to the vehicle may be presented with a larger size, in a color that is bright red, with accelerated flashing, or other characteristics and visual effects, whereas visualizations 530 that are farther away from the vehicle may be presented with a smaller size, in a color that is light green or yellow, with no flashing, or other characteristics and visual effects.

As a result, various types of visualizations 530 of objects, such as pedestrians or bicyclists, may be presented with various characteristics and visual effects to increase awareness of such objects and maintain safety of the pedestrians and bicyclists during remote operation of the vehicle. In addition, other types of visualizations 530 of objects, such as motor vehicles or emergency vehicles, may be presented with various other characteristics and visual effects to increase awareness of such objects and maintain safe operation of the vehicle relative to other vehicles. Further, visualizations 530 of objects that may be closer or proximate to the vehicle may be presented with various further characteristics and visual effects that may suggest greater urgency or importance of awareness by the teleoperator of such objects.

In additional example embodiments, audio data may be captured by audio sensors, microphones, and/or arrays onboard a vehicle within an environment. The audio data may be associated with people, pedestrians, bicycles, motorcycles, vehicles, animals, and/or various other types of objects within an environment. The audio data may be received by a processor, e.g., a processing unit associated with a teleoperator station, and the processor may process the audio data to identify one or more sounds. The processing of the audio data may be performed using various types of algorithms or techniques, such as pattern matching algorithms, machine learning models, neural networks, and/or other types of processing algorithms.

In addition, based on the determined relevant objects, as well as the relative locations of identified relevant objects within the environment, the audio data may be further processed to extract sounds associated with the relevant objects at the relative locations in the environment. In some examples, audio sensor arrays or microphone arrays may be beamformed to detect and capture audio data associated with desired positions or locations relative to the vehicle, such that identified sounds associated with such audio data may be logically associated with the beamformed positions or locations relative to the vehicle. In other examples, audio data that is captured by audio sensor arrays or microphone arrays may be processed to extract sounds associated with relative locations in the environment based on times of receipt of sounds by individual sensors or microphones of an array, e.g., extracting sounds emanating from or present at the relative locations in the environment corresponding to the identified relevant objects. In example embodiments, such sounds may not be readily audible to the human ear and/or may only be faintly detected by the audio sensors, particularly when the sounds associated with relative locations are not isolated or separated from various other sounds in the environment that are detected by the audio sensors.

Furthermore, in addition to presenting visualizations or visual indications 530 of relevant objects at relative locations within an environment, various sounds associated with the relevant objects may also be emitted for a teleoperator at a teleoperator station. For example, the extracted sounds may be amplified and emitted to increase awareness of the teleoperator. In addition or alternatively, one or more sounds that are associated with the identified relevant objects may be synthesized or generated based on known or recorded sounds of similar objects, and then the synthesized sounds may be emitted to increase awareness of the teleoperator.

Moreover, the sounds associated with relevant objects may be presented with various aspects or characteristics, such as volume or loudness, tone, pitch, frequency, or other aspects. In some examples, the various audio characteristics of sounds associated with the visualizations 530 may be selected based on types, locations, and/or proximity of the relevant objects. For example, sounds associated with various types of objects, e.g., pedestrians or bicyclists, may be amplified and emitted for a teleoperator, whereas sounds associated with other types of objects, e.g., vehicles, may be emitted without amplification. In addition, sounds associated with objects that are closer to the vehicle may be emitted with greater amplification and/or harsher tone, whereas sounds associated with objects that are farther from the vehicle may be emitted with lesser amplification and/or softer tone.

Furthermore, the sounds associated with relevant objects may be presented or emitted via one or more audio output devices as spatial audio, which may include a directionality of the emitted audio that indicates a source or direction of the sounds relative to the vehicle in the environment. In this manner, spatial audio may provide a three-dimensional, positional awareness of a source or direction of sounds to further increase environment awareness by the teleoperator at a teleoperator station.

In further example embodiments, audio sensors, microphones, or arrays associated with a vehicle may be incorporated or combined with various other types of sensors, including imaging sensors or devices, infrared sensors, depth sensors, radar, LIDAR, or other time of flight sensors, or other types of sensors. In one example, a sound camera that includes an imaging sensor, e.g., RGB (red-green-blue) camera, and a microphone array may be used to detect and capture both audio and imaging data associated with objects around a vehicle within an environment. Based on objects identified from imaging data captured by the imaging sensor of the camera, relevant objects and their relative locations within imaging data may be identified, and one or more visualizations may be presented in association with the relevant objects, such as object point clouds, bounding boxes, or other symbols, text, or indicia. Further, the visualizations may be presented with various characteristics and visual effects as described herein, and sounds identified from audio data captured by the microphone array of the sound camera and associated with the relative locations may also be extracted, amplified, synthesized, and/or emitted for presentation with the visualizations of the relevant objects. In other examples, audio sensors, microphones, or arrays may be incorporated or combined with various other types of sensors to identify objects, determine relevant objects, present visualizations of such objects, and emit sounds associated with such objects, in order to increase environment awareness.

In still further example embodiments that present and/or emit imaging data, audio data, and visualizations or visual indicators using an augmented or extended reality helmet, headset, or wearable device, a direction of a teleoperator's eyes or gaze may be determined or measured using various sensors or imaging devices of the wearable device. Based on the eye or gaze tracking of a teleoperator, positions, locations, and visual characteristics of visualizations or visual indicators may be modified to appropriately alert or notify the teleoperator of identified relevant objects. For example, visualizations that may be within a field of view of a teleoperator's eye or gaze direction may be presented at such locations, whereas visualizations that may not be within a field of view of a teleoperator's eye or gaze direction may be moved or shifted to be presented at locations within or closer to a teleoperator's eye or gaze direction. Further, spatial direction and audio characteristics of emitted audio of the identified objects may also be modified to appropriately alert or notify the teleoperator of identified relevant objects. For example, based on a teleoperator's eye or gaze direction, directionality of emitted sounds may need to be changed or modified, and/or other audio characteristics such as volume, pitch, tone, or other aspects may also be changed based on a teleoperator's eye or gaze direction.

Although FIG. 5 illustrates a particular number, type, configuration, and arrangement of visualizations or visual indicators associated with identified relevant objects, other example embodiments may include various other numbers, types, configurations, or arrangements of visualizations or visual indicators associated with identified relevant objects. For example, various other types of objects may be identified, other numbers or types of visualizations may be presented, visualizations may have various other shapes, sizes, locations, and/or other visual characteristics or effects, and/or various other modifications may be made in additional example embodiments.

Figure 6:
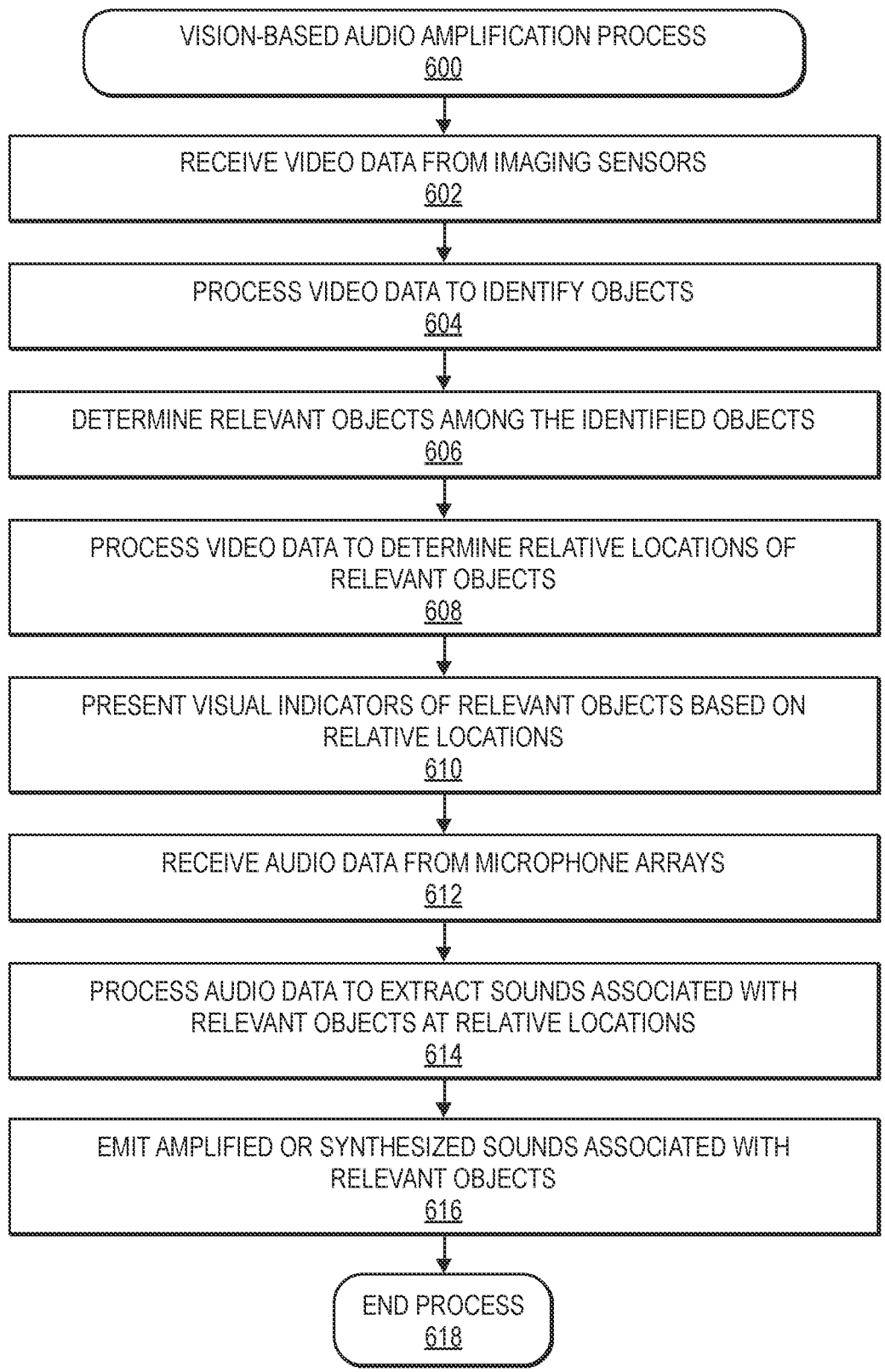
FIG. 6 is a flow diagram illustrating an example vision-based audio amplification process, in accordance with implementations of the present disclosure.

FIG. 6 is a flow diagram illustrating an example vision-based audio amplification process 600, in accordance with implementations of the present disclosure.

The process 600 may begin by receiving video data from one or more imaging sensors, as at 602. The imaging sensors may be associated with a vehicle within an environment, and may capture imaging data from the environment around the vehicle. In some examples, the imaging sensors may be positioned or oriented to have desired fields of view relative to the vehicle, e.g., toward a forward movement direction, toward a rearward movement direction, and/or toward other portions of a periphery of the vehicle. The imaging data may comprise representations of various types of objects within an environment, including people, pedestrians, bicycles, motorcycles, vehicles, animals, and/or various other types of objects. Further, a processor may receive the imaging data captured by one or more imaging sensors.

The process 600 may continue by processing the video data to identify objects, as at 604. For example, various processing algorithms or techniques, such as pattern matching algorithms, image recognition algorithms, feature recognition algorithms, machine learning models, neural networks, or other imaging data processing algorithms or techniques may process the imaging data to identify known or recognized objects. The processing algorithms may have been trained with various training data in order to recognize various types of objects. Further, a processor may process the imaging data to identify objects.

The process 600 may proceed by determining relevant objects among the identified objects, as at 606. For example, based on the identification of objects within the imaging data, relevant objects may be determined, such as people, pedestrians, bicycles, motorcycles, vehicles, animals, dynamic or moving objects, and/or various other types of objects. The processing algorithms may also have been trained with various training data in order to determine relevant objects among the various identified objects. Alternatively, one or more data stores, tables, lookup tables, or other data storage devices may include data or information related to relevant objects. Further, a processor may determine relevant objects among the identified objects.

The process 600 may then continue to process the video data to determine relative locations of the relevant objects, as at 608. For example, based on known positions, orientations, and/or fields of view of the imaging sensors, positions or locations of identified relevant objects within the imaging data of the environment may be determined relative to the vehicle. In addition, data from various other types of sensors, such as infrared sensors, depth sensors, and/or time of flight sensors, may be used to further determine relative locations of the relevant objects in the environment. Further, a processor may process the imaging data to determine relative locations of the relevant objects.

The process 600 may proceed to present visualizations of the relevant objects based on the relative locations, as at 610. For example, visualizations or visual indicators of the relevant objects, including various visual characteristics or effects, may be presented within or overlaid onto imaging data for a teleoperator at a teleoperator station. The visualizations may be presented via a presentation device at locations that may be associated with or proximate the determined locations of the objects relative to the vehicle in the environment. Further, a processor may cause presentation of visualizations of the relevant objects based on the relative locations.

The process 600 may continue with receiving audio data from one or more microphone arrays, as at 612. The audio sensor or microphone arrays may be associated with the vehicle within the environment, and may capture audio data from the environment around the vehicle. In some examples, the microphone arrays may be beamformed to detect and capture audio data at desired locations or positions relative to the vehicle. In other examples, the microphone arrays may not be beamformed and may detect and capture audio data around the vehicle, which audio data may be later processed to determine locations of identified sounds relative to the vehicle. The audio data may comprise sounds associated with various types of objects within an environment, including people, pedestrians, bicycles, motorcycles, vehicles, animals, and/or various other types of objects. Further, a processor may receive the audio data captured by one or more microphone arrays.

The process 600 may proceed with processing the audio data to extract sounds associated with relevant objects at relative locations, as at 614. For example, the audio data captured by an audio sensor or microphone array may be processed to extract sounds at a determined location of a relevant object, e.g., based on times of receipt by individual sensors or microphones of the identified sounds. In this manner, sounds emanating from or present at the relative location in the environment corresponding to the identified relevant object may be extracted, separate, and/or isolated from various other sounds present within the environment. Further, a processor may process the audio data to extract sounds associated with relevant objects at relative locations.

The process 600 may then continue by emitting amplified or synthesized sounds associated with the relevant objects, as at 616. For example, the extracted sounds may be amplified and emitted for presentation to a teleoperator. In addition or alternatively, one or more sounds associated with the relevant objects may be synthesized or generated for emission to the teleoperator. Moreover, various audio characteristics of the extracted or synthesized sounds may be modified or adjusted based on aspects of the relevant objects and/or their relative locations. Further, a processor may cause emission of amplified or synthesized sounds associated with the relevant objects.

The process 600 may then end, as at 618.

Using the process described at least with respect to FIG. 6, imaging data may be processed to identify and determine relevant objects, and determine relative locations of such relevant objects. Then, visualizations or visual indicators of the relevant objects may be generated and presented based on the identified relevant objects and relative locations. Further, sounds associated with relevant objects at relative locations may be extracted, separated, or isolated from various other sounds, and sounds associated with the relevant objects may be amplified or synthesized for emission or presentation. In this manner, a teleoperator at a teleoperator station may receive visual and audio information related to relevant objects, e.g., objects of interest within a field of view, or distant or peripheral portions of a field of view, of an imaging device that captures imaging data for the teleoperator but having associated sounds that may generally not be discernable by the human ear, such that the teleoperator may have an increased awareness of the environment around a vehicle and safely operate the vehicle via the teleoperator station.

Figure 7:
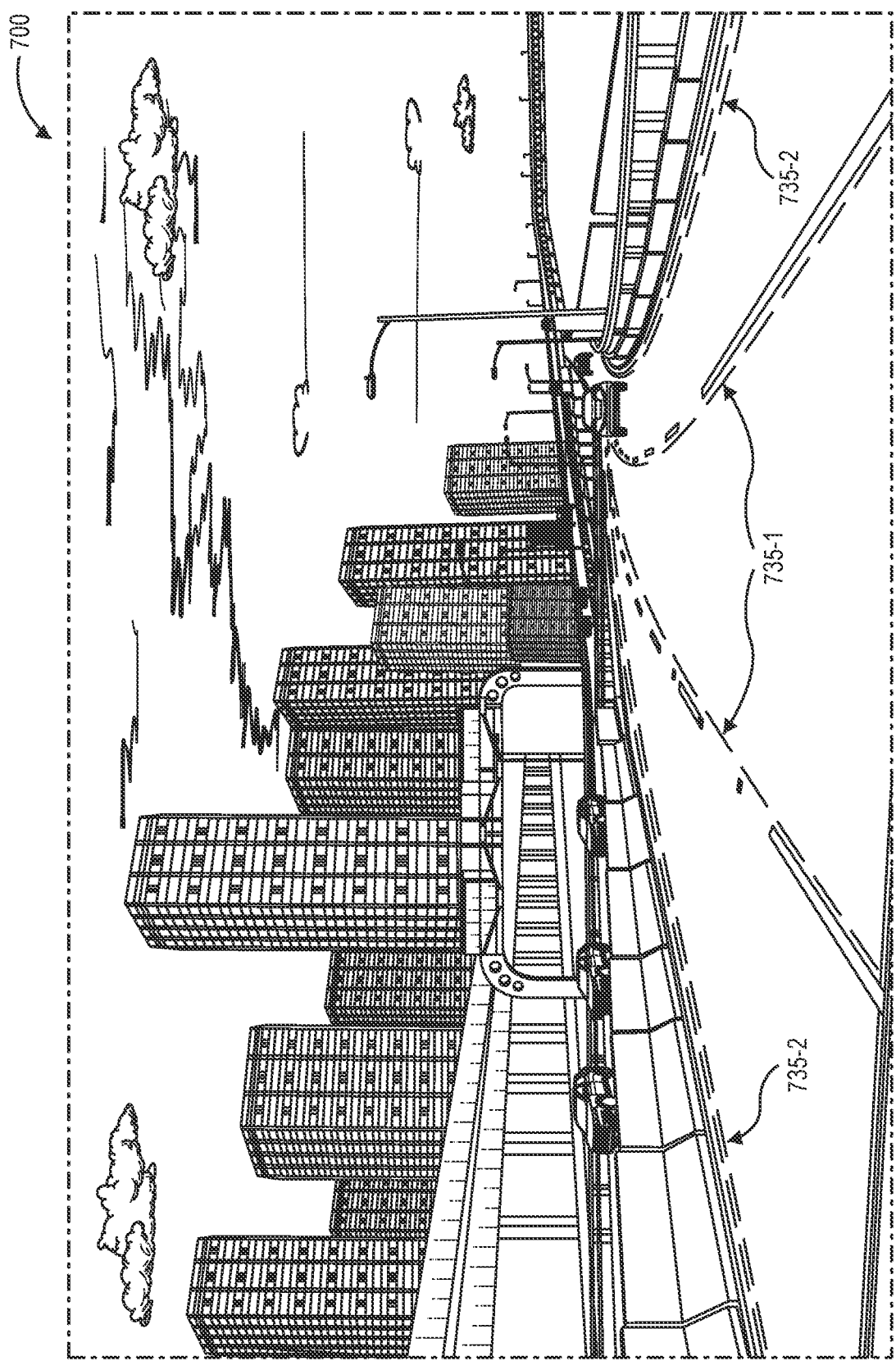
FIG. 7 is a schematic diagram of an example video data including visual indications of safety tunnel parameters to ensure safe driving behaviors, in accordance with implementations of the present disclosure.

FIG. 7 is a schematic diagram 700 of an example video data including visual indications of safety tunnel parameters to ensure safe driving behaviors, in accordance with implementations of the present disclosure.

In example embodiments, during remote driving applications, a safety tunnel having various associated safety tunnel parameters may be determined, visualized, and/or enforced in order to ensure safe driving behaviors. For example, the safety tunnel may comprise a determination or delineation of drivable space within which remote operation of the vehicle may be allowed or permitted. Generally, the drivable space on highways, freeways, parkways, or similar roadways may comprise all available lanes or portions of such roadways, and may exclude any adjacent or peripheral portions that are not intended for vehicle operation. Furthermore, the drivable space on streets, avenues, or other urban or suburban roadways may comprise available lanes of such roadways and may exclude any sidewalks, cycling lanes, parking spots, or other adjacent or peripheral portions that are not intended for vehicle operation. In addition, the safety tunnel may comprise a location-based safety system that defines various safety tunnel parameters related to operation of the vehicle, based at least in part on location and/or map data associated with a current environment around a vehicle.

Various data may be received from a vehicle that is remotely driven, operated, or controlled in order to determine the safety tunnel parameters associated with operation of a vehicle in a current environment. For example, location data may be received from the vehicle, e.g., from one or more location sensors, global positioning system (GPS) sensors, and/or other types of sensors. The location data may be correlated or compared with map data, in order to determine various aspects of the current environment, including roadways, lanes, curves, turns, distances, angles, grades, slopes, speeds, or other aspects related to operation of the vehicle. Further, location and map data may be continually or periodically learned or updated based on additional data received from various sensors onboard a vehicle, e.g., imaging data, audio data, other sensor data, drive state information, vehicle operational data, and/or other data.

In addition, vehicle data associated with various aspects of the vehicle may also be received in order to determine the safety tunnel parameters associated with operation of a vehicle in a current environment. For example, the vehicle data may relate to operational characteristics of the vehicle, such as available or maximum steering angles, available or maximum yaw rates, available or maximum steering torques, available or maximum speeds, available or maximum accelerations, and/or various other vehicle operational data. Further, the vehicle data may relate to operational capabilities of the vehicle, such as on-road or off-road capabilities, available transmissions or geartrains, and/or other vehicle capabilities.

Further, various sensor data from one or more sensors onboard the vehicle may also be received in order to determine the safety tunnel parameters associated with operation of a vehicle in a current environment. For example, the sensor data may be received from imaging sensors, infrared sensors, depth sensors, audio sensors, time of flight sensors, and/or various other types of sensors. In some examples, the sensor data may generally relate to dynamic or moving objects that may be present in the current environment, such as people, pedestrians, bicycles, motorcycles, vehicles, animals, and/or various other types of objects. In other examples, the sensor data may also relate to relatively static aspects of the current environment, including structures, buildings, roadways, signs, fixtures, temporary barriers or obstacles, or other types of objects within the environment.

The safety tunnel parameters may be determined based on any or all of the various data related to the current environment, e.g., location data, map data, vehicle data, and/or sensor data. For example, the safety tunnel parameters may comprise one or more limits or controls related to operation of the vehicle, such as allowing steering angles, ranges, rates of change, or torques, allowable speeds or ranges, allowable accelerations, decelerations, and/or braking, allowable combinations of steering, speed, and/or acceleration, and/or various other operational characteristics of the vehicle.

In example embodiments, the safety tunnel parameters related to steering angle, yaw rate, and/or steering torque may ensure safe driving behaviors by preventing inadvertent lane changing, preventing driving in wrong lanes or in wrong directions, preventing unsafe maneuvers, preventing driving in non-vehicle or non-drivable areas, and/or various other safety measures. In addition, the safety tunnel parameters related to speed and/or acceleration may ensure safe driving behaviors by preventing excessive speeds, preventing excessive acceleration, deceleration, or braking, and/or various other safety measures. Further, the drive state information received from the vehicle may provide data or information related to current steering angle, yaw rate, steering torque, speed, acceleration, and/or other operational characteristics of the vehicle, which may be compared to the safety tunnel parameters of the current environment to ensure safe driving behaviors.

In some example embodiments, remote operation of a vehicle may be required or forced to stay within or follow the safety tunnel parameters. For example, inadvertent lane changing may be prevented by actively maintaining the vehicle in a current lane, absent express instruction of an intention to change lanes, such as by activation of a turn signal indicator, and/or absent an overriding safety or emergency situation. In addition, movement of a vehicle past lateral boundaries onto a shoulder or side of a roadway may also be prevented by actively maintaining the vehicle within the roadway, absent express instruction of an intention to move outside the roadway, such as by activation of a turn signal indicator, and/or absent an overriding safety or emergency situation.

In addition, excessive speed of a vehicle may be prevented by actively maintaining the vehicle within the applicable speed limit, absent express instruction of an intention to exceed the allowable speed and/or absent an overriding safety or emergency situation. Further, excessive acceleration, deceleration, or braking may also be prevented by actively maintaining operation of the vehicle within applicable limits, absent express instruction of an intention to exceed the allowable acceleration and/or absent an overriding safety or emergency situation.

In other example embodiments, remote operation of a vehicle may be encouraged or alerted to stay within or follow the safety tunnel parameters, but operation with characteristics that exceed the safety tunnel parameters may be allowed, again absent an overriding safety or emergency situation. For example, if an allowable steering angle, yaw rate, steering torque, speed, and/or acceleration limit is reached or exceeded, a notification or alert may be provided, presented, or emitted for a teleoperator. The notification or alert may be visual, audio, and/or haptic, such as visual alerts presented via a presentation device, audio alerts or information presented via the presentation device, and/or haptic feedback, such as shaking of a steering wheel, countertorque applied to the steering wheel, vibration of a teleoperator seat, and/or forces, torques, movement, or vibration applied to other portions of a control interface of the teleoperator station.

Referring again to FIG. 7, based on the determined safety tunnel parameters related to a current environment of a vehicle, various notifications or alerts may be generated and presented, provided, or emitted for a teleoperator to ensure safe driving behaviors. Generally, the example notification or alerts illustrated and described with respect to FIG. 7 may be associated with safety tunnel parameters based on location data, map data, and/or vehicle data of a current environment.

For example, one or more visual notifications or alerts 735 may be generated and presented via a presentation device of the teleoperator station. As shown in FIG. 7, a first visual alert 735-1 may relate to boundaries of a current lane within which the vehicle is traveling, and a second visual alert 735-2 may relate to boundaries of the roadway along which the vehicle is traveling. In addition to the example visual alerts 735, one or more audio alerts may also be emitted for the teleoperator, e.g., sounds or information related to approaching or crossing boundaries of a current lane and/or boundaries of the roadway, sounds or information related to approaching or crossing one or more speed and/or acceleration limits, and/or sounds or information related to other operational characteristics. Further in addition to the example visual alerts 735 and example audio alerts, one or more haptic alerts or feedback may also be emitted for the teleoperator, e.g., movement, shaking, and/or vibration of portions of the control interface, applications of counterforce or countertorque to pedals, buttons, steering wheel, and/or other input elements, and/or various other types of haptic feedback related to changes to steering angles, yaw rates, steering torques, speeds, accelerations, and/or other operational characteristics.

Furthermore, in addition to notifications related to safety tunnel parameters for allowable steering angle, yaw rate, and/or steering torque, various notifications related to safety tunnel parameters for speed and/or acceleration of the vehicle may also be presented, provided, and/or emitted for the teleoperator. As one example, a maximum speed may be associated with the current lane and/or roadway, and various visual, audio, and/or haptic alerts may be presented or emitted to encourage operations within such maximum speed. Likewise, a maximum acceleration may be associated with the current lane and/or roadway, and various visual, audio, and/or haptic alerts may be presented or emitted to encourage operations within such maximum acceleration.

Further, the various notifications related to safety tunnel parameters may be presented with different characteristics. For example, visual alerts may be presented with different colors, line types, line weights, highlighting, outlining, flashing, or other characteristics. In one example, when operation of the vehicle is within the safety tunnel parameters, the visual alerts may be presented in a color green, with thin, solid lines, and/or no highlighting or flashing. In another example, when operation of the vehicle exceeds one or more safety tunnel parameters, the visual alerts may be presented in a color amber or red, with thicker, solid lines, and/or with highlighting or flashing.

In addition, audio alerts may be presented with different volumes, pitches, tones, frequency, or other characteristics. In one example, when operation of the vehicle is within the safety tunnel parameters, the audio alerts may be presented in a lower volume, at a low or medium pitch, and/or with a smooth or clear tone. In another example, when operation of the vehicle exceeds one or more safety tunnel parameters, the audio alerts may be presented in a higher volume, at a higher pitch, and/or with a harsh or dissonant tone.

Further, haptic feedback may be presented with different intensity, force, torque, frequency, or other characteristics. In one example, when operation of the vehicle is within the safety tunnel parameters, the haptic alerts may be presented in a lower intensity, with low or medium force or torque, and/or with a slow or steady frequency. In another example, when operation of the vehicle exceeds one or more safety tunnel parameters, the haptic alerts may be presented in a higher intensity, with higher force or torque, and/or with a rapid or unsteady frequency.

Figure 8:
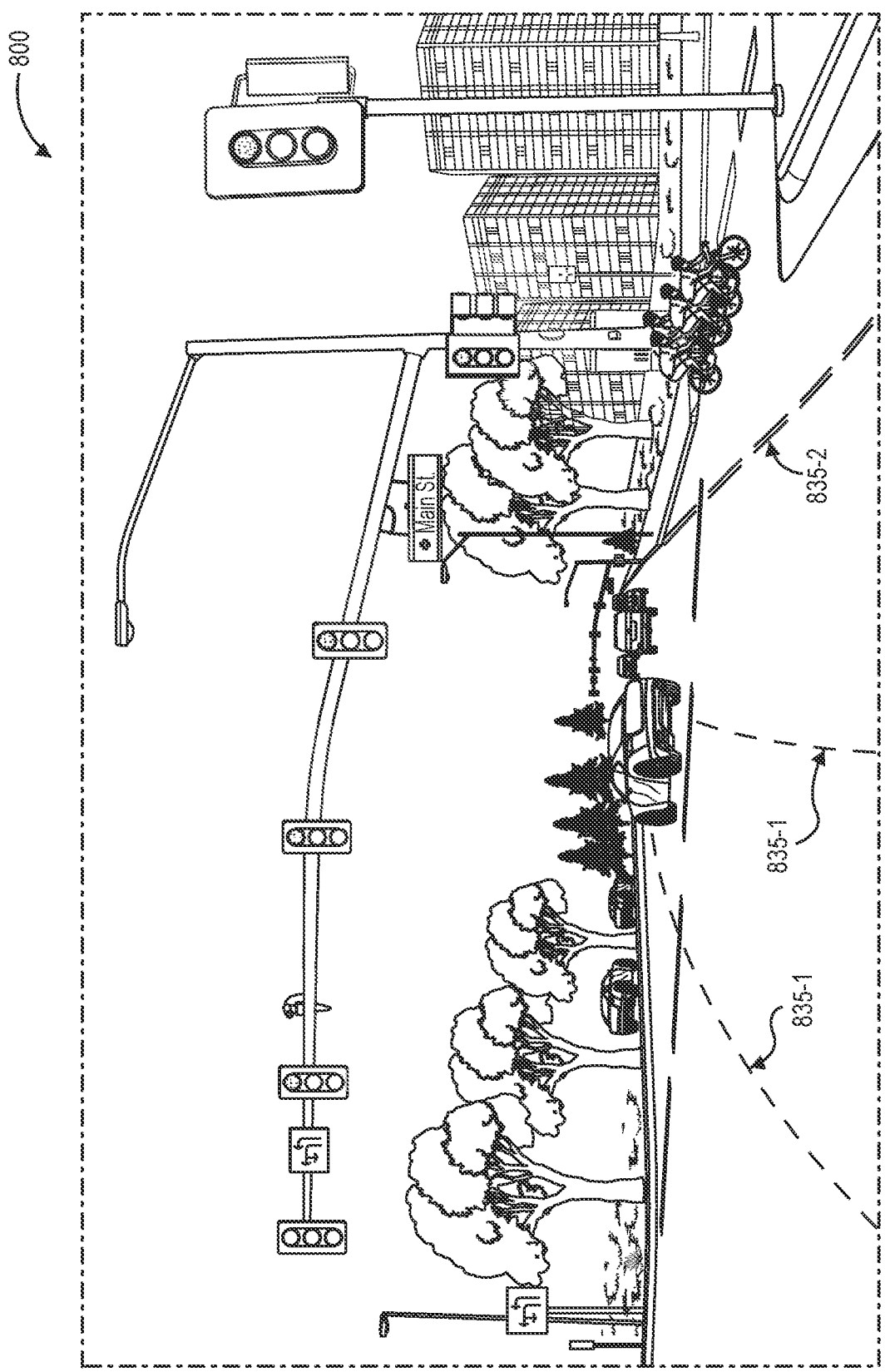
FIG. 8 is a schematic diagram of another example video data including visual indications of safety tunnel parameters to ensure safe driving behaviors, in accordance with implementations of the present disclosure.

FIG. 8 is a schematic diagram 800 of another example video data including visual indications of safety tunnel parameters to ensure safe driving behaviors, in accordance with implementations of the present disclosure.

As shown in FIG. 8, based on the determined safety tunnel parameters related to a current environment of a vehicle, various notifications or alerts may be generated and presented, provided, or emitted for a teleoperator to ensure safe driving behaviors. Generally, the example notification or alerts illustrated and described with respect to FIG. 8 may be associated with safety tunnel parameters based on location data, map data, and/or vehicle data, as well as sensor data, of a current environment.

In example embodiments, the sensor data received from various sensors onboard the vehicle, e.g., imaging sensors, infrared sensors, depth sensors, audio sensors, time of flight sensors, and/or other sensors, may be further processed to determine or generate safety tunnel parameters that account for dynamic or moving objects or portions of the environment. In this manner, various objects that may be detected within an environment, e.g., people, pedestrians, bicycles, motorcycles, vehicles, animals, and/or various other types of dynamic or moving objects, may be accounted for in the generation of safety tunnel parameters, thereby further ensuring safe driving behaviors of the vehicle with respect to such dynamic objects.

For example, one or more visual notifications or alerts 835 may be generated and presented via a presentation device of the teleoperator station. As shown in FIG. 8, a first visual alert 835-1 may relate to boundaries of a current lane within which the vehicle is traveling, and a second visual alert 835-2 may relate to boundaries of the roadway along which the vehicle is traveling. Unlike the second visual alert 735-2 illustrated in FIG. 7 related to a physical, static boundary of the roadway, the second visual alert 835-2 may relate to a dynamic, safety boundary that is generated based on one or more dynamic objects, e.g., a group of cyclists, that have been detected in sensor data from one or more sensors onboard the vehicle. Various other types of dynamic boundaries, limits, or controls may be generated in association with the safety tunnel parameters to account for various types of dynamic or moving objects within the current environment.

As described herein at least with respect to FIG. 7, in addition to the example visual alerts 835, one or more audio alerts may also be emitted for the teleoperator, e.g., sounds or information related to approaching or crossing boundaries of a current lane, boundaries of the roadway, one or more speed and/or acceleration limits, and/or various dynamic boundaries, limits, or controls. Further in addition to the example visual alerts 835 and example audio alerts, one or more haptic alerts or feedback may also be emitted for the teleoperator, e.g., movement, shaking, and/or vibration of portions of the control interface, applications of counterforce or countertorque to pedals, buttons, steering wheel, and/or other input elements, and/or various other types of haptic feedback related to changes to steering angles, yaw rates, steering torques, speeds, accelerations, and/or other operational characteristics.

Furthermore, in addition to notifications related to safety tunnel parameters for allowable steering angle, yaw rate, and/or steering torque, various notifications related to safety tunnel parameters for speed and/or acceleration of the vehicle may also be presented, provided, and/or emitted for the teleoperator. As one example, a maximum speed may be associated with the current lane and/or roadway, and various visual, audio, and/or haptic alerts may be presented or emitted to encourage operations within such maximum speed. Likewise, a maximum acceleration may be associated with the current lane and/or roadway, and various visual, audio, and/or haptic alerts may be presented or emitted to encourage operations within such maximum acceleration. As further described herein at least with respect to FIGS. 7 and 8, the various notifications related to safety tunnel parameters may be presented with different characteristics that may encourage or alert a teleoperator to the various safety tunnel parameters within the current environment.

In further example embodiments, at least partially or fully autonomous remote operation of a vehicle may be initiated or instructed if the vehicle operation exceeds the safety tunnel parameters, and/or to prevent collision, injury, harm, damage, and/or various other safety or emergency situations. Generally, autonomous remote operation of a vehicle to ensure safety may comprise slowing and/or stopping the vehicle. However, the safety tunnel parameters associated with the current environment may affect or inform the particular autonomous remote operation that is initiated or instructed to ensure safety.

For example, if a vehicle is traveling along a highway or other relatively high speed roadway, slowing and/or stopping the vehicle on such a roadway may potentially be hazardous to other drivers and vehicles. Thus, based on the safety tunnel parameters related to steering angle, yaw rate, steering torque, speed, and acceleration on the highway, autonomous remote operation of the vehicle may comprise maintaining speed with other vehicles on the highway, following another vehicle that is traveling on the highway at a safe trailing distance, identifying an exit from the highway and exiting before slowing and/or stopping, and/or various other types of autonomous operation.

In another example, if a vehicle is traveling through an intersection, slowing and/or stopping the vehicle in the middle of an intersection may potentially be hazardous to other drivers and vehicles. Thus, based on the safety tunnel parameters related to steering angle, yaw rate, steering torque, speed, and acceleration on the roadway, autonomous remote operation of the vehicle may comprise maintaining speed with other vehicles on the roadway, continuing through the intersection, following another vehicle that is traveling on the roadway at a safe trailing distance, identifying a shoulder or side of the roadway past the intersection and moving to the shoulder before slowing and/or stopping, and/or various other types of autonomous operation.

Other types of autonomous operation based on safety tunnel parameters may include various combinations of continuing operation at reduced speeds, substantially maintaining a current steering angle, yaw rate, or steering torque, maintaining operation in a current lane or along the roadway, following other vehicles that are operating within the safety tunnel parameters, identifying safe locations along the roadway to slow and/or stop, moving to a side of a roadway, identifying preset locations to which the vehicle may autonomously proceed, and/or various other types of autonomous operation.

In additional example embodiments, the various types of autonomous remote operation based on safety tunnel parameters may also be initiated or instructed in various other situations or for various other reasons. For example, if a remotely operated vehicle loses a communication connection with a teleoperator station for a defined period of time, autonomous remote operation based on safety tunnel parameters may be initiated or instructed to ensure safe operation of the vehicle. In addition, if various vehicle characteristics or operational parameters indicate a problem or issue with the vehicle, e.g., an engine problem, braking issue, flat tire, low fuel, or other potential safety issues, autonomous remote operation based on safety tunnel parameters may be initiated or instructed to ensure safe operation of the vehicle.

Figure 9:
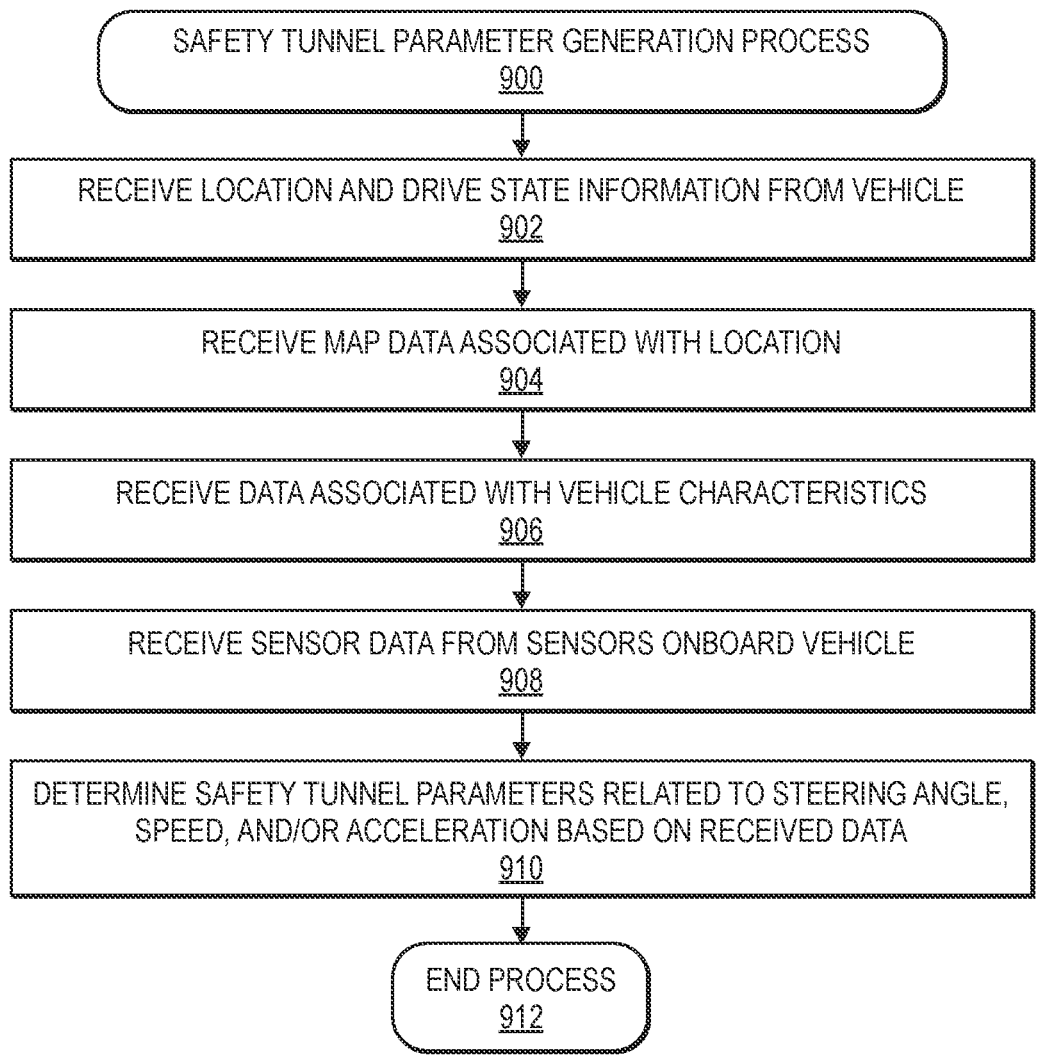
FIG. 9 is a flow diagram illustrating an example safety tunnel parameter generation process, in accordance with implementations of the present disclosure.

FIG. 9 is a flow diagram illustrating an example safety tunnel parameter generation process 900, in accordance with implementations of the present disclosure.

The process 900 may begin by receiving location data and drive state information from a vehicle, as at 902. For example, one or more location sensors, GPS sensors, or other position or location determination sensors may detect or capture location data associated with a current environment of the vehicle. In addition, various sensors onboard the vehicle may detect or measure drive state information of the vehicle, such as steering angle, yaw rate, steering torque, speed, acceleration, and/or other operational characteristics of the vehicle. Moreover, a communication unit onboard the vehicle may transmit the location data and drive state information to a communication unit and processor at a teleoperator station via a communication network. Further, the communication unit and processor of the teleoperator station may receive the location data and drive state information from the vehicle.

The process 900 may continue by receiving map data associated with the location data, as at 904. For example, map data may include data associated with roadways, lanes, curves, turns, distances, angles, grades, slopes, speeds, intersections, landmarks, structures, or other aspects or features associated with particular locations. The map data may be generally static or fixed; however, the map data may also be updated continuously or periodically based on changes to various aspects or features at particular locations. In addition, the map data may be stored in memory locally at the teleoperator station, and/or the map data may be stored in data storage remote from the teleoperator station. Further, the processor may receive or retrieve map data based on the location data associated with the current environment of the vehicle.

The process 900 may proceed by receiving vehicle data associated with vehicle characteristics, as at 906. For example, vehicle data may include data associated with vehicle type, capabilities, operation, or other aspects or features. Vehicle type may include various aspects such as coupe, sedan, SUV, truck, van, engine or motor type, front wheel drive, rear wheel drive, all or four wheel drive, and/or other aspects. Vehicle capabilities or operational characteristics may relate to available or maximum steering angles, available or maximum yaw rate, available or maximum steering torque, available or maximum speeds, available or maximum accelerations, decelerations, or braking, on-road or off-road capabilities, available transmissions or geartrains, and/or other vehicle capabilities or operational characteristics. In addition, the vehicle data may be stored in memory locally at the teleoperator station, and/or the vehicle data may be stored in data storage remote from the teleoperator station. Further, the processor may receive or retrieve vehicle data associated with the vehicle characteristics.

The process 900 may continue to receive sensor data from sensors onboard the vehicle, as at 908. For example, various sensors onboard the vehicle, such as imaging sensors, infrared sensors, depth sensors, audio sensors, time of flight sensors, and/or other types of sensors, may detect or capture data associated with objects or portions of the environment. Generally, the sensor data may relate to dynamic or moving objects, such as people, pedestrians, bicycles, motorcycles, vehicles, animals, and/or various other types of dynamic or moving objects. In addition, the sensor data may also relate to relatively static aspects of the current environment, including structures, buildings, roadways, signs, fixtures, temporary barriers or obstacles, or other types of objects within the environment. Further, the processor may receive the sensor data from the vehicle.

The process 900 may then proceed to determine safety tunnel parameters related to steering angle, speed, and/or acceleration based on the received data, as at 910. For example, based on location and map data, safety tunnel parameters related to allowable steering angle, allowable yaw rate, allowable steering torque, allowable speeds, and/or allowable accelerations may be generated or modified, e.g., based on known curves, turns, angles, grades, slopes, or distances of roadways, based on posted or known speed limits, based on historical data related to safe or allowable steering angles, yaw rates, steering torques, speeds, and/or accelerations, and/or based on other aspects or features of the location and map data. In addition, based on vehicle data, safety tunnel parameters may be generated or modified, e.g., based on vehicle capabilities related to steering angle, yaw rate, steering torque, speeds, and/or accelerations, and/or based on other aspects or features of the vehicle data. Moreover, based on sensor data, safety tunnel parameters may be generated or modified, e.g., based on dynamic or moving objects within the environment, based on changes to aspects of the location or environment, based on temporary restrictions, obstacles, or barriers within the environment, and/or based on other aspects or features of the sensor data. Based on various combinations of the received data, safety tunnel parameters related to allowable steering angles, allowable yaw rates, allowable steering torques, allowable speeds, allowable accelerations, and/or various other operational characteristics of the vehicle may be generated or modified to ensure safe driving behaviors of the vehicle within the current environment. Further, the processor may determine the safety tunnel parameters based on the received data.

The process 900 may then end, as at 912.

Figure 10:
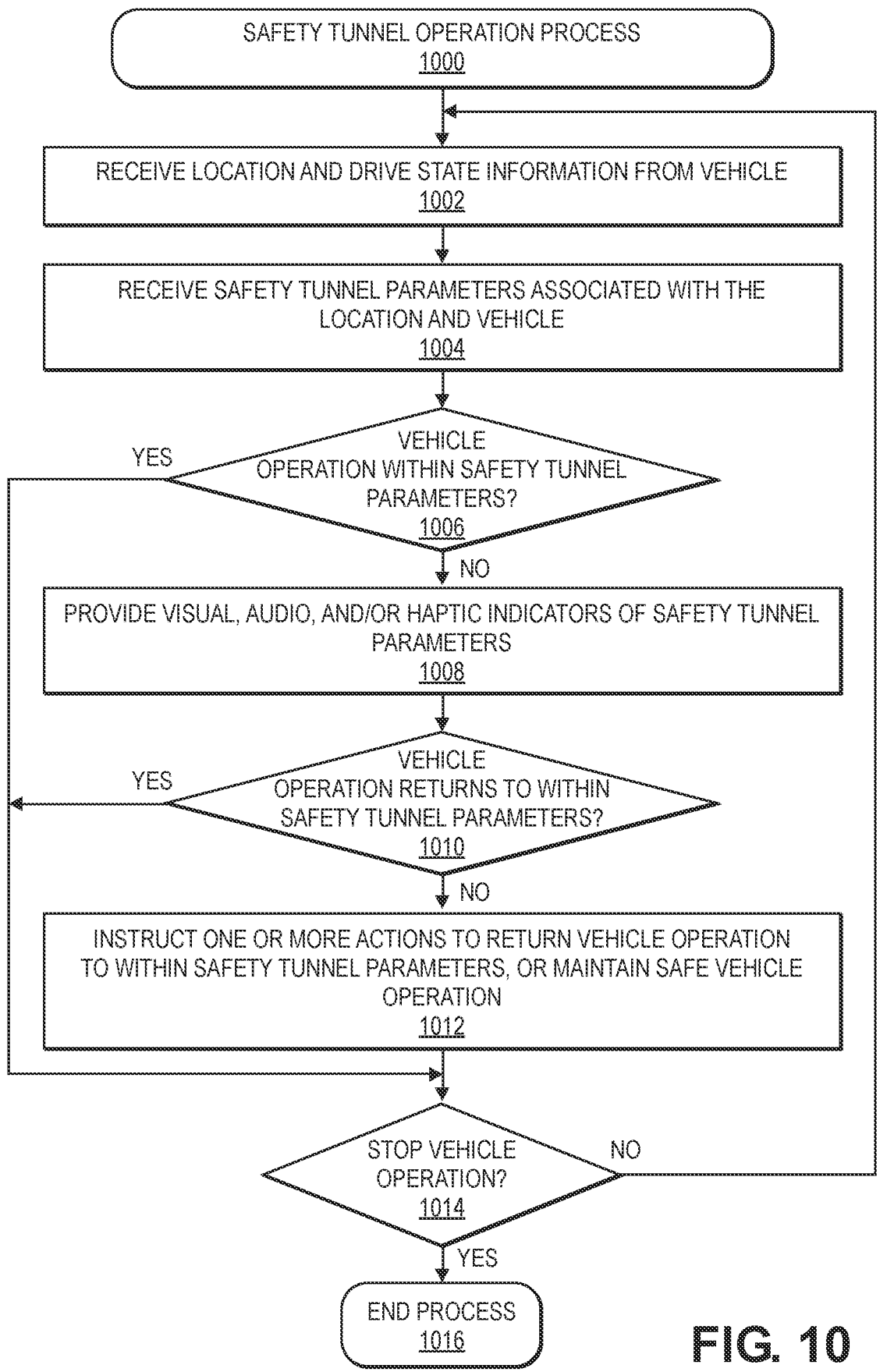
FIG. 10 is a flow diagram illustrating an example safety tunnel operation process, in accordance with implementations of the present disclosure.

FIG. 10 is a flow diagram illustrating an example safety tunnel operation process 1000, in accordance with implementations of the present disclosure.

The process 1000 may begin by receiving location data and drive state information from a vehicle, as at 1002. For example, one or more location sensors, GPS sensors, or other position or location determination sensors may detect or capture location data associated with a current environment of the vehicle. In addition, various sensors onboard the vehicle may detect or measure drive state information of the vehicle, such as steering angle, yaw rate, steering torque, speed, acceleration, and/or other operational characteristics of the vehicle. Moreover, a communication unit onboard the vehicle may transmit the location data and drive state information to a communication unit and processor at a teleoperator station via a communication network. Further, the communication unit and processor of the teleoperator station may receive the location data and drive state information from the vehicle.

The process 1000 may continue by receiving safety tunnel parameters associated with the location and vehicle, as at 1004. For example, safety tunnel parameters related to allowable steering angles, allowable yaw rates, allowable steering torques, allowable speeds, allowable accelerations, and/or various other operational characteristics of the vehicle may be generated or modified based on various data, including location data, map data, vehicle data, and/or sensor data, as described herein at least with respect to FIG. 9. Further, the processor may receive or retrieve the safety tunnel parameters associated with the location of the vehicle within the current environment.

The process 1000 may proceed by determining whether the vehicle operation is within the safety tunnel parameters, as at 1006. For example, the drive state information received from the vehicle may be compared with the safety tunnel parameters to determine whether the vehicle is operating within the boundaries or limits of the safety tunnel parameters. In addition, drive control commands received from a teleoperator at the teleoperator station may also be compared with the safety tunnel parameters to determine whether the commands or instructions to be provided to the vehicle are also within the boundaries or limits of the safety tunnel parameters. Further, the processor may determine whether the vehicle operation is within the safety tunnel parameters.

If the vehicle operation is not within the safety tunnel parameters, the process 1000 may continue to provide visual, audio, and/or haptic indicators of the safety tunnel parameters, as at 1008. For example, visual notifications or alerts may be presented to a teleoperator at the teleoperator station to encourage or alert the teleoperator to maintain vehicle operation within the safety tunnel parameters, such as data or information related to allowable steering angles, yaw rates, steering torques, speeds, and/or accelerations, visual indicators of boundaries or limits of operation within the current environment, and/or other visual notifications. In addition, audio notifications or alerts may also be presented or emitted to a teleoperator at the teleoperator station to encourage or alert the teleoperator to maintain vehicle operation within the safety tunnel parameters, such as data or information related to allowable steering angles, yaw rates, steering torques, speeds, and/or accelerations, audio alerts related to boundaries or limits of operation within the current environment, and/or other audio notifications. Moreover, haptic alerts or feedback may be presented or emitted to a teleoperator at the teleoperator station to encourage or alert the teleoperator to maintain vehicle operation within the safety tunnel parameters, such as vibration, shaking, motion, counterforces, countertorques, or other feedback by portions of a control interface related to boundaries or limits of operation within the current environment, and/or other types of haptic feedback. Further, the processor may cause presentation or emission of various visual, audio, and/or haptic indicators of the safety tunnel parameters.

The process 1000 may then proceed to determine whether the vehicle operation returns to within the safety tunnel parameters, as at 1010. For example, following presentation or emission of one or more alerts or notifications, the drive state information received from the vehicle may be compared with the safety tunnel parameters to determine whether the vehicle is returning to operation within the boundaries or limits of the safety tunnel parameters. In addition, drive control commands received from a teleoperator at the teleoperator station may also be compared with the safety tunnel parameters to determine whether the commands or instructions to be provided to the vehicle are also returning to within the boundaries or limits of the safety tunnel parameters. Further, the processor may determine whether the vehicle operation is returning to within the safety tunnel parameters.

If the vehicle operation is not returning to within the safety tunnel parameters, the process 1000 may continue with instructing one or more actions to return the vehicle operation to within the safety tunnel parameters, or maintain safe vehicle operation, as at 1012. For example, various partially or fully autonomous remote operation programs or control routines may be initiated or instructed to return the vehicle operation to within the safety tunnel parameters, and/or to otherwise maintain safe vehicle operation. In some examples, vehicle operation may be actively returned to within the safety tunnel parameters, e.g., by implementing changes to steering angle, yaw rate, steering torque, speeds, and/or accelerations that are within the respective allowable ranges. With such active changes by autonomous remote operation programs or control routines to the vehicle operation, remote operation of the vehicle by the teleoperator may nonetheless at least partially continue. In other examples, remote operation of the vehicle by the teleoperator may cease or be prevented, and various autonomous remote operation programs or control routines may initiate or instruct vehicle operation based on the safety tunnel parameters. Based on the location or map data, vehicle data, and/or sensor data associated with the current environment, the autonomous remote operation programs or control routines may initiate different types of vehicle operation. Generally, the vehicle may slow down and/or stop to ensure safety within the current environment. However, in some situations or environments, autonomous vehicle operation may instruct continued movement within the safety tunnel parameters, moving to a shoulder or side of a roadway, making one or more turns or changes to direction, following one or more other vehicles on the roadway, identifying safe locations to slow and/or stop, and/or various other changes to steering angle, yaw rate, steering torque, speed, and/or acceleration to maintain safety in the current environment. Further, the processor may instruct one or more actions to ensure safe driving behaviors within the safety tunnel parameters of the vehicle.

If the vehicle is operating within the safety tunnel parameters, as at 1006, or if the vehicle operation is returning to within the safety tunnel parameters, as at 1010, or if one or more actions are instructed to ensure safe driving behaviors within the safety tunnel parameters, as at 1012, the process 1000 may then proceed with determining whether to stop vehicle operation, as at 1014. For example, the vehicle operation may stop as a result of various factors, such as completing navigation to a destination, parking the vehicle in the environment, shutting off the vehicle in the environment, handover of control of the vehicle to a driver physically present within the vehicle, and/or various other factors. In addition, the vehicle operation may stop as a result of initiating or instructing partially or fully autonomous remote operation programs or control routines to slow and stop the vehicle. Further, the processor may determine whether to stop vehicle operation.

If it is determined that vehicle operation is not to be stopped, the process 1000 may return to step 1002 to continue to receive data and safety tunnel parameters associated with a location of the vehicle within the current environment, and continue to monitor vehicle operation with respect to the safety tunnel parameters, as described herein. If, however, it is determined that the vehicle operation is to stop, the process 1000 may then end, as at 1016.

By generating safety tunnels having various safety tunnel parameters related to operational characteristics of a vehicle within a current environment, remote operations of the vehicle, as well as drive control commands from a teleoperator to be implemented by the vehicle, may be maintained within the safety tunnel parameters associated with the location of the vehicle. Further, the safety tunnel parameters may also take into account dynamic or moving objects within the environment to maintain safe operations even in changing environments and with respect to people, pedestrians, bicyclists, animals, other vehicles, and/or other dynamic objects or portions of the environment. In this manner, safe and reliable driving behaviors of a remotely driven or controlled vehicle may be ensured, encouraged, and/or enforced.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 4, 6, 9, and 10, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method to ensure safe driving behaviors in a remote driving system, comprising:
  receiving, by a processor at a teleoperator station via a communication network, location data and drive state information associated with a vehicle, the vehicle being positioned within an environment remote from the teleoperator station;
  receiving, by the processor, map data associated with the location data;
  receiving, by the processor, vehicle data associated with the vehicle;
  receiving, by the processor, sensor data from one or more sensors onboard the vehicle;
  determining, by the processor, one or more safety tunnel parameters for the vehicle based on the location data, the map data, the vehicle data, and the sensor data;
  determining, by the processor, that the drive state information exceeds the one or more safety tunnel parameters;
  instructing, by the processor, modification to operation of the vehicle within the one or more safety tunnel parameters; and
  causing presentation, via a presentation device at the teleoperator station, of at least one indicator related to the one or more safety tunnel parameters;
  wherein the one or more safety tunnel parameters comprise at least one of allowable steering angle, allowable yaw rate, allowable steering torque, or allowable acceleration.

2. The method of claim 1, wherein the location data is received from a location sensor onboard the vehicle; and
  wherein the map data comprises data associated with at least one of roadways, lanes, curves, turns, distances, angles, or speeds.

3. The method of claim 1, wherein the vehicle data comprises data associated with operational characteristics or capabilities of the vehicle.

4. The method of claim 1, wherein the one or more sensors comprise at least one of an imaging sensor, an audio sensor, or a time of flight sensor; and
  wherein the sensor data comprises data associated with a dynamic object within the environment around the vehicle.

5. The method of claim 1, wherein the one or more safety tunnel parameters further comprise allowable speed.

6. A method, comprising:
  receiving, by a processor associated with a teleoperator station via a network, location data and drive state information associated with a vehicle, the vehicle being positioned within an environment remote from the teleoperator station;
  receiving, by the processor, map data associated with the location data;
  determining, by the processor, safety tunnel parameters for the vehicle based at least in part on the location data and the map data;
  determining, by the processor, that the drive state information exceeds the safety tunnel parameters; and
  in response to determining that the drive state information exceeds the safety tunnel parameters: instructing, by the processor, modification to operation of the vehicle within the safety tunnel parameters;
  wherein the safety tunnel parameters comprise at least one of allowable steering angle, allowable yaw rate, allowable steering torque, or allowable acceleration.

7. The method of claim 6, wherein the location data is received from a location sensor onboard the vehicle; and
  wherein the map data comprises data associated with at least one of roadways, lanes, curves, turns, distances, angles, or speeds.

8. The method of claim 6, wherein the safety tunnel parameters further comprise allowable speed.

9. The method of claim 6, further comprising:
  receiving, by the processor, vehicle data associated with the vehicle, the vehicle data comprising data associated with operational characteristics or capabilities of the vehicle;
  wherein the safety tunnel parameters are further determined based on the vehicle data.

10. The method of claim 6, further comprising:
  receiving, by the processor, sensor data from one or more sensors onboard the vehicle, the one or more sensors comprising at least one of an imaging sensor, an audio sensor, or a time of flight sensor, and the sensor data comprising data associated with at least one object within the environment around the vehicle;
  wherein the safety tunnel parameters are further determined based on the sensor data.

11. The method of claim 6, further comprising:
  in response to determining that the drive state information exceeds the safety tunnel parameters:
    causing presentation, via a presentation device associated with the teleoperator station, of an indicator related to the safety tunnel parameters.

12. The method of claim 11,
  wherein the indicator related to the safety tunnel parameters comprises at least one of visual, audio, or haptic feedback.

13. The method of claim 12, wherein the indicator related to the safety tunnel parameters comprises a visual boundary presented within imaging data.

14. The method of claim 6, further comprising:
  in response to determining that the drive state information exceeds the safety tunnel parameters:
    instructing, by the processor, safe autonomous operation of the vehicle within the environment;
    wherein the safe autonomous operation comprises at least one of slowing or stopping the vehicle.

15. The method of claim 14, further comprising:
  determining, by the processor, the safe autonomous operation of the vehicle based at least in part on the safety tunnel parameters.

16. A remote driving system, comprising:
  a vehicle within an environment, the vehicle comprising an imaging device; and
  a teleoperator station that is remote from the vehicle, the teleoperator station in communication with the vehicle via a communication network, the teleoperator station comprising a control interface, a presentation device, and a processor;
  wherein the processor is configured to at least:
    receive location data and drive state information associated with the vehicle;
    receive map data associated with the location data;
    determine safety tunnel parameters for the vehicle based at least in part on the location data and the map data;
    determine that the drive state information exceeds the safety tunnel parameters; and in response to determining that the drive state information exceeds the safety tunnel parameters: instruct modification to operation of the vehicle within the safety tunnel parameters;

wherein the safety tunnel parameters comprise at least one of allowable steering angle, allowable yaw rate, allowable steering torque, or allowable acceleration.

17. The remote driving system of claim 16, wherein the safety tunnel parameters further comprise at least one of allowable steering angle, allowable yaw rate, allowable steering torque, allowable speed, or allowable acceleration.

18. The remote driving system of claim 16, wherein the vehicle further comprises one or more sensors including at least one of an imaging sensor, an audio sensor, or a time of flight sensor; and wherein the processor is further configured to at least:
receive sensor data from the one or more sensors, the sensor data comprising data associated with at least one object within the environment around the vehicle;

wherein the safety tunnel parameters are further determined based on the sensor data.

19. The remote driving system of claim 16, wherein the processor is further configured to at least:

in response to determining that the drive state information exceeds the safety tunnel parameters:
cause presentation, via the presentation device, of an indicator related to the safety tunnel parameters;
wherein the indicator related to the safety tunnel parameters comprises at least one of a visual indication of a boundary, an audio notification, or a haptic feedback.

20. The remote driving system of claim 16, wherein the processor is further configured to at least:

in response to determining that the drive state information exceeds the safety tunnel parameters:
instruct safe autonomous operation of the vehicle within the environment.

* * * * *